(12) United States Patent
Wright, Sr.

(10) Patent No.: US 10,872,077 B2
(45) Date of Patent: Dec. 22, 2020

(54) MANAGEMENT OF ENTITLEMENTS USING BLOCKCHAIN

(71) Applicant: David D. Wright, Sr., Santa Cruz, CA (US)

(72) Inventor: David D. Wright, Sr., Santa Cruz, CA (US)

(*) Notice: Subject to any disclaimer, the term of this patent is extended or adjusted under 35 U.S.C. 154(b) by 260 days.

(21) Appl. No.: 15/816,025

(22) Filed: Nov. 17, 2017

(65) Prior Publication Data

US 2018/0089256 A1 Mar. 29, 2018

Related U.S. Application Data

(63) Continuation-in-part of application No. 15/730,593, filed on Oct. 11, 2017, now abandoned, which is a continuation of application No. 14/493,195, filed on Sep. 22, 2014, now Pat. No. 9,798,763.

(60) Provisional application No. 62/532,604, filed on Jul. 14, 2017, provisional application No. 61/881,296, filed on Sep. 23, 2013.

(51) Int. Cl.
*G06F 16/23* (2019.01)
*G06F 16/182* (2019.01)
*G06F 16/27* (2019.01)
*G06F 16/901* (2019.01)
*G06Q 20/12* (2012.01)

(52) U.S. Cl.
CPC ...... *G06F 16/2379* (2019.01); *G06F 16/1824* (2019.01); *G06Q 20/1235* (2013.01); *G06F 16/2358* (2019.01); *G06F 16/27* (2019.01); *G06F 16/9024* (2019.01); *H04L 2209/38* (2013.01)

(58) Field of Classification Search
CPC ............ H04L 2209/38; H04L 9/3247; H04L 2209/56; H04L 9/0861; G06Q 2220/00; G06Q 20/3829; G06Q 20/065; G06Q 50/18; G06Q 20/405; G06F 21/645; G06F 21/62; G06F 21/64; G06F 21/10; G06F 21/6245; G06F 16/00; G06F 16/1824; G06F 16/2358; G06F 16/27; G06F 16/9024
USPC .......... 707/661, 822, 827, 999.01, 747, 783
See application file for complete search history.

(56) References Cited

U.S. PATENT DOCUMENTS

| | | | |
|---|---|---|---|
| 10,380,702 B2* | 8/2019 | McCoy | G06Q 20/1235 |
| 2016/0323109 A1* | 11/2016 | McCoy | G06Q 50/184 |
| 2017/0116693 A1* | 4/2017 | Rae | G06Q 20/3827 |
| 2017/0221029 A1* | 8/2017 | Lund | G06F 21/00 |
| 2018/0189755 A1* | 7/2018 | Kilpatrick | H04W 4/24 |
| 2018/0248880 A1* | 8/2018 | Sardesai | H04L 63/101 |

(Continued)

*Primary Examiner* — Dangelino N Gortayo
(74) *Attorney, Agent, or Firm* — Soquel Group LLC

(57) ABSTRACT

Methods for managing entitlements of products and services using blockchain are described. One method includes the steps of storing by a blockchain fabric a ledger that stores transaction data, smart contracts that process transactions, creating an entitlement, receiving by the blockchain a create entitlement transaction request, adding, by the smart contract, an entitlement block to the ledger, issuing by the entitled product a usage transaction that reports usage of the entitled product, upon receiving the usage transaction, adding, by a smart contract, a usage block to the ledger, and determining, by the smart contract, that an entitlement limit has been reached. Another method describes a container mechanism that provides a way to identify all blocks associated with a base entitlement.

11 Claims, 12 Drawing Sheets

(56) References Cited

U.S. PATENT DOCUMENTS

2018/0285979 A1* 10/2018 Chessell ................ G06Q 40/08
2018/0287893 A1* 10/2018 O'Brien .............. H04L 41/5048
2018/0343175 A1* 11/2018 Bathen .................... H04L 67/10
2019/0287146 A1*  9/2019 Maitland ................. H04L 41/12

* cited by examiner

MANAGEMENT OF ENTITLEMENTS USING BLOCKCHAIN

TECHNICAL FIELD

Various embodiments relate to the management of assets using blockchain. In particular, the assets being managed are entitled products.

BACKGROUND

Increasingly, entitlements, i.e. the terms of usage for an asset, are managed across networks such as the Internet. As a result, the management of entitled assets is of particular concern given the distributed nature of the Internet.

To resolve the underlying lack of trust between a vendor of an entitl products and users of the product requires clear communication regarding the entitlement purchased by a user and supplied by a vendor and the subsequent usage or consumption of the entitlement by the user.

Previously, managing usage of an entitlement by a uniquely identified instance of an entitlement required manual auditing of usage information, often combined with onerous enforcement mechanisms such a "license keys" that are used to restrict consumption of an entitled asset by the consumer.

In recent years, blockchain technology has emerged as a viable approach for developing distributed, transaction-based applications.

Thus, it is with respect to these considerations and others that the present invention has been made.

SUMMARY OF THE DESCRIPTION

The subject invention uses blockchain technology to provide an underlying distributed, transactional, database for entitlement management. Embodiments of the invention may be used to create, and track entitled products and services, referred to hereinbelow simply as entitled products. Entitled products may include software components and other intangible assets as well as tangible assets such as automobiles. The underlying blockchain technology includes transactions, ledgers and smart contracts which together implement tag and tag management features and capabilities. The subject invention defines entitlement transactions between vendors and end-users of entitled products that are used to create entitlements, add-on features and capabilities to existing entitlements and to renew entitlements.

Embodiments of the invention use standard blockchain features, including an immutable distributed database, shareable between vendor and consumer which contains entitlement transactions supplied by the vendor, plus usage transactions, supplied by the user/consumer. Such capabilities combined with the ability to define the business relationship between vendor and consumer using Blockchain smart contracts provides the capability of systematic entitlement management.

Certain embodiments of the invention disclose methods for managing entitlements of products and services using blockchain. One method includes the steps of storing by a blockchain fabric a ledger that stores transaction data, smart contracts that process transactions, creating an entitlement, receiving by the blockchain a create entitlement transaction request, adding, by the smart contract, an entitlement block to the ledger, issuing by the entitled product a usage transaction that reports usage of the entitled product, upon receiving the usage transaction, adding, by a smart contract, a usage block to the ledger, and determining, by the smart contract, that an entitlement limit has been reached.

The invention discloses a mechanism, referred to as a container, that is used to link entitlement transactions in a blockchain, thus enabling tracking of use and status of entitlements. A container can be used to verify that product and service configurations requested by an end-user are within a vendor's configuration guidelines.

One embodiment of a method that uses containers for managing entitlements includes a blockchain fabric that stores (1) a ledger that comprises a time sequence of blocks wherein each block stores data from a transaction request received from an entitlement management service, the ledger including (i) entitlement blocks that store data corresponding to entitlements, wherein an entitlement is purchased from a vendor and enables an end-user to use an entitled product under a specified set of usage rights, and (ii) usage blocks that store usage data corresponding to usage of an entitled product by an end-user, (2) at least one smart contract, where a smart contract processes a transaction on behalf of the blockchain fabric; and (3) a container, wherein a container includes a plurality of blocks that are linked together, the plurality of blocks comprising a first entitlement block that corresponds to a first entitlement, creating, by the entitlement management service, an add-on entitlement, associated with the first entitlement, that adds rights to use the entitled product, receiving, by the blockchain fabric, an add-on entitlement transaction request from the entitlement management service to add the add-on entitlement to the ledger, executing by the blockchain fabric a smart contract that corresponds to the create add-on entitlement transaction, and adding, by the smart contract, the add-on entitlement to the ledger and linking the add-on entitlement to the most recently added block in the container.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description of the Preferred Embodiment, which is to be read in association with the accompanying drawings, wherein.

Figure 1:
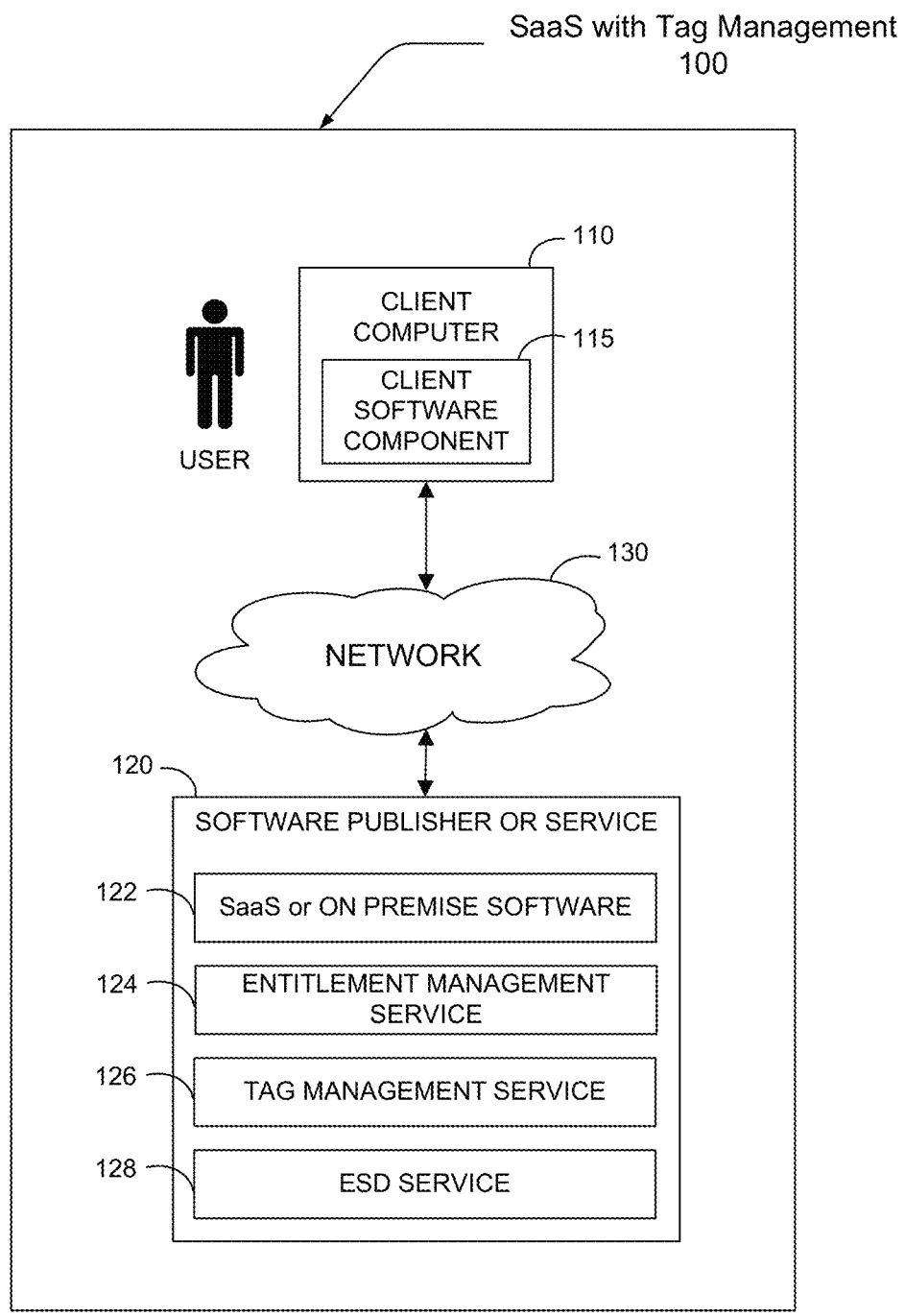
FIG. 1 is a generalized block diagram of a preferred embodiment of a system that includes a software publisher or service that distributes a client software component to a client computer and which uses a tag management service to identify, track and manage software components at each step of a service or software life cycle.

Reference symbols and labels are used in the Figures to indicate certain components, aspects or features shown therein, with reference symbols and labels common to more than one Figure indicating like components, aspects or features shown therein.

DETAILED DESCRIPTION

The invention now will be described more fully hereinafter with reference to the accompanying drawings, which form a part hereof, and which show, by way of illustration, specific exemplary embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the invention may be embodied as methods, processes, systems, business methods or devices. Accordingly, the present invention may take the form of an entirely hardware embodiment, an entirely software embodiment or an embodiment combining software and hardware aspects. The following detailed description is, therefore, not to be taken in a limiting sense.

As used herein the following terms have the meanings given below:

Software as a Service (SaaS)—means a computer application that is delivered to users on a service basis in which software components are delivered to a client computer from a network-based computing facility.

On premise software—means a computer application that is delivered from and run on computers on the premises (e.g. in the building or organization) of the person or organization using the software.

Client software component—a software module that is distributed from a SaaS service or from an on premise system for use in a client computer by a user.

Tag—as used herein is a data structure that is associated with a client software component, typically although not exclusively via a unique identifier. A tag typically includes static information, or attributes, that describe the nature of the client software component such as the component name, edition, version, etc., as well as dynamic attributes, that are modified during the life cycle of the client software component. For example, dynamic attributes may be modified when the client software component is deployed or activated. Further dynamic attributes may include metrics relating to the use of the component such as time active, work carried out, etc., either with respect to the component standalone, or in association with other identifiable components. The tag may also contain a reference to entitlements that specify rights to use the component in some fashion. A tag is typically created using a tag generation tool, or tag tool. The features and operation of such a tag tool are outside the scope of the subject invention unless otherwise indicated herein.

Tagging—refers to the operation of associating one or more tags to a client software component or document or piece of information.

Tag prototype—refers to a template from which a tag is created. There are certain attributes in a tag that remain static, i.e. which do not change over time, for instance, client software component name, version, description, possibly other attributes. Thus, the tag prototype forms the basis of and is used to create each new instance of a tag. Typically, instances of a tag include additional information, i.e. in addition to the static attributes, such as creation date/time, association IDs, etc.)

Entitlement—means the set of one or more rights granted for the use or consumption of a tangible product, for example a hardware or software product, a unit of information or a service.

License—means the agreement between a user of a client software component and the provider or owner of the client software component. A license typically includes one or more entitlements that give the terms of usage of the client software component by a user. As used herein, a license is an agreement between the grantor and grantee that includes one or more entitlements that govern the rights of usage of a client software component by a user.

Session—also referred to as a user session or client session means a discrete instance of use or a period of use of a client software component. A session typically refers to a period of use of the client software component by a user. Sessions typically end when a user explicitly terminates use such as when they close a document or quite a program but may be terminated automatically after a period of non-activity.

Verification—as used herein means the identification of exceptions between a tag stored in a client computer, a corresponding tag stored by a software service and a policy for managing exceptions. As described hereinbelow with reference to FIGS. 5-7, verification is performed at least at the beginning and end of each session of a client software component. Verification refers to (1) the comparison between the tag on the client computer and tag stored by the service to determine if they are identical, and (2) if they are determined to be identical then an analysis of the tag attributes to see if there are exceptions relative to a pre-established policy. The policy governs any actions that are taken as a result of having identified an exception. For example, if the tag stored in the client is different than the tag stored by the service then the policy may be to alert an administrator that tampering has occurred. As another example, if the tag indicates that version 1 of a client software component is in use on the client computer but the most recent version is version 2, then the policy may dictate that a message be sent to an administrator suggested that they upgrade the client software component for that client computer. Generally, verification will determine matters such as if the client software component is of the right version or patch level, if the number of instances of a client software component are in conformance with the number of users or seats that have been licensed and the like. The tag management service presented herein allows such verification to be performed without dictating the policies that may be implemented should the verification process identify exceptions. Thus, the policy itself is outside the scope of the subject invention.

Entitled product—as used herein means a product, or products, whose terms of usage are defined by an entitlement. An entitled product may be a tangible item such as an automobile whose usage is determined by an entitlement such as a lease or rental agreement. Additionally, an entitled product may be a nontangible item such as a music recording that is distributed to a user and whose usage is determined by an entitlement such as an end-user agreement that specifies the terms of usage of the recording.

Vendor—as used herein means a company, person, or other entity that sells an entitlement to an entitled product; in some cases the vendor also provides the entitled product, and/or the entitlement, to a user of the product.

End-user, consumer or user—as used herein means a company, person, or other entity that receives and consumes or uses an entitled product. End-user also refers to the computer equipment that may be used by an end-user to interact with the entitlement system. For example, if an end-user receives an entitlement that is in digital format it is understood that a personal computer, mobile device, or other piece of equipment actually receives the digital entitlement.

Blockchain—as used herein means a continuously growing list of records, called blocks, which are linked and secured using cryptography. Each block typically contains a hash pointer as a link to a previous block, a timestamp and transaction data. By design, blockchains are inherently resistant to modification of the data. A blockchain can serve as a distributed ledger that can record transactions between two parties in a verifiable and permanent way. For use as a distributed ledger, a blockchain is typically managed by a peer-to-peer network collectively adhering to a protocol for validating new blocks. Once recorded, the data in any given block cannot be altered retroactively without the alteration of all subsequent blocks, which needs a collusion of the network majority. Blockchain is used by public applications such as BITCOIN that rely on a public leger as well as private applications that rely on private ledgers. Generally, as used herein, blockchain refers to the general characteristics and capabilities provided by all blockchain implementations. Specifically, the blockchain features relied upon in this invention are provided by the HYPERLEDGER framework and projects from the LINUX FOUNDATION, available at https://www.hyperledger.org/.

Smart contract—as used herein means a computation that takes place on a blockchain or distributed ledger to process, verify, or enforce an entitlement. While smart contracts have been used primarily in association with cryptocurrencies such as BITCOIN, their use has been generalized for use in association with blockchain applications.

Tag Structure

Table 1 below provides an example of the attributes that may be included in a tag that is associated with a client software component. This list of attributes is intended to be exemplary and not limiting. A set of some or all of these attributes can be partially or completely encapsulated in a data structure and encrypted or digitally signed in order to provide a mechanism to detect tampering with the encapsulated attributes.

TABLE 1

Exemplary Tag Attributes

| Attribute Name | Description |
| --- | --- |
| Title | The name of a product or service as assigned by its manufacturer |
| Version | Version number of a product or service. |
| Creator | This attribute allows a software or service management process to identify the manufacturer that created the software service. |
| Licensor | The software licensor who issued the entitlement for the software component use and/or service. |
| ID | provides information that can be used to reference a specific version of a specific product or service. May be used to distinguish different upgrade levels. |
| Tag Creator | The identity of the tag creator for the component being tagged. |
| Abstract | A summary of the software package or service that this tag applies to. |
| Deployment Details | A set of attributes that provide the locations of the client software component as well as deployment instance details. |
| Entitlement Linkage | provides entitlement information and can be used as a means to connect an entitlement to this tagged client software component. |
| Serial Number | A unique identifier for the tagged instance of a client software component. . |
| Tag creator | Provides additional tag creator information in order to provide identification of previous entities that are related to the creation of the tag. |
| Tag Version | Used for management and audit during the tag life cycle (as against the software or entitlement life cycle). There may be multiple instances of this attribute as the life cycle progresses. |
| Usage Identifier | An identifier that indicates whether this instance of a client software component has been "activated", which is the first event in the usage of a client software component. This identifier can be used to determine, for instance, that the client software component has been deployed, but never activated, and thus has never been "used". This flag is not meant to provide any other metric of "usage" other than initial activation. |
| Deployment Details | Provides time/date of deployment, identification of deployment agent, etc. |
| Session Status | Indicates the state of client software component session. Set to "Init" when a service/client software component session commences, set to "closed" after an orderly session shutdown |

Generalized Operation

The operation of certain aspects of the invention is described below with respect to FIGS. 1-8.

FIG. 1 is a generalized block diagram of a preferred embodiment of a system that includes a software publisher or service 120, henceforth referred to as service 120, which distributes a client software component 115 to a client computer 110 and which uses a tag management service 126 to identify, track and manage software components at each step of a service or software life cycle. System 100 includes client software component 115 that runs in a client computer 110. Client software component 115 is provided across a network 130 by service 120. Generally, service 120 may be any service or computer system that provides client software modules to client computers for execution on a license basis. This includes inter alia cloud-based Software as a Service (SaaS) and on premise software systems. Service 120 is typically implemented as one or more computer servers accessible across network 130 via standardized web services or other defined application programming interfaces (APIs).

Service 120 includes a SaaS or premise software system 122, an entitlement management service 124, a tag management service 126, and an electronic software distribution (ESD) service 128.

SaaS or premise software system 122 is typically a cloud service or enterprise software service or system that provides applications such as ERP for use by a user using a client computer such as client computer 110 in a corporate or organization-wide network.

Entitlement management service 124 manages entitlements that define usage conditions for client software components, as previously discussed.

Tag management service 126 creates, tracks and manages tags that are injected into, or associated with, client software components such as client software component 115, to enable them to be individually identified, tracked and managed across the life cycle of service 120. In one embodiment, when a client software component is deployed a build tag is created from a tag prototype with any relevant deployment information, and assigned a unique serial number, and then placed on client computer 110 by tag management service 126 such that the tag is co-located with client software component 115 in a pre-defined location on client computer 110, typically in non volatile memory on disk. The tag is subsequently updated to reflect additional status information such as deployment of client software component 115. In one embodiment, management of tags is carried out entirely by tag management service 126, as tag management service 126 is "trusted", i.e. it is under the secured control of the service provider that provides service 120; whereas if logic located in client computer 110 is employed as part of tag management service 126 this is potentially an "untrusted" location, i.e. where the logic might be tampered with by an entity with access to client computer 110. In other embodiments, portions of tag management service 126 may run in client computer 110.

Electronic software delivery service 128 delivers a software "distribution" to client computer 110 for use by a user via electronic distribution (ESD), i.e. the distribution is transmitted across a network, or via physical media such as a CD, DVD or USB drive.

Figure 2:
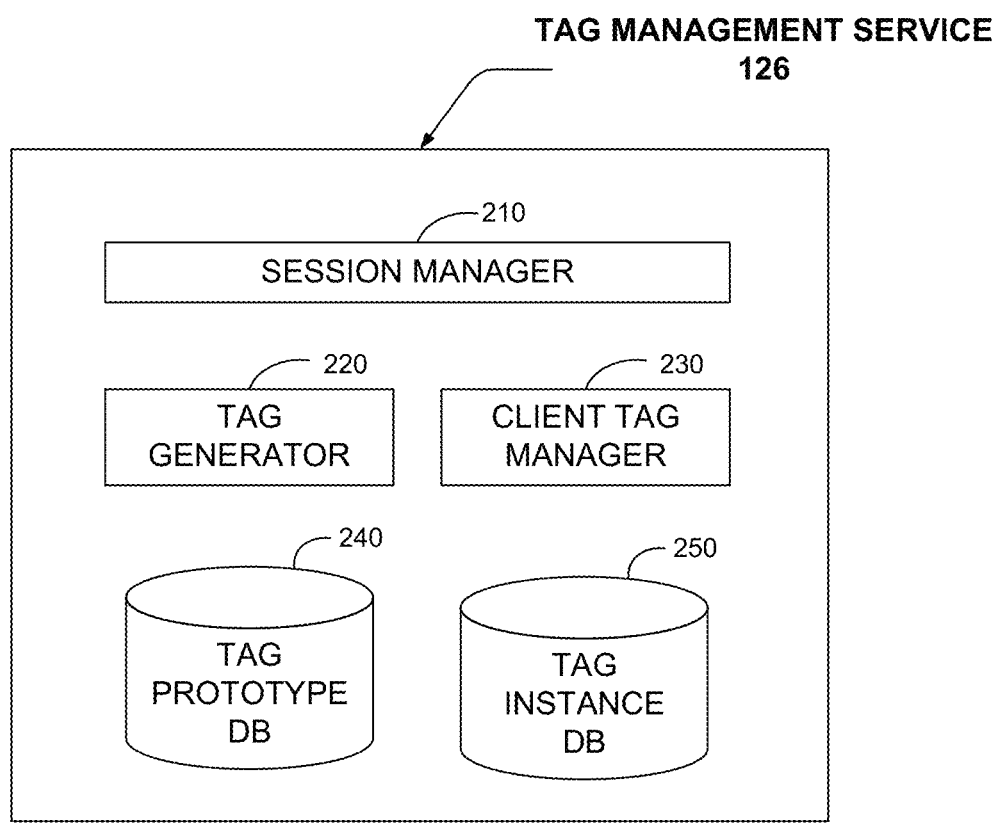
FIG. 2 is a generalized block diagram of a preferred embodiment of the modules included in a tag management service used by a software publisher system or service that distributes and manages client software components across all steps of the service or software life cycle.

FIG. 2 is a generalized block diagram of a preferred embodiment of the modules included in a tag management service 126 included in service 120 that distributes and manages client software components across all steps of the service or software life cycle. Tag management service 126 includes a session manager 210, a tag generator 220, a client tag manager 230 and two database services, tag prototype database service 240, and tag instance database 250.

Session manager 210 manages sessions between client computer 110 and tag management service 126.

Tag generator 220 creates tags and returns them to the requesting service.

In one embodiment, client tag manager 230 is considered a trusted source of computation. Client tag manager 230 performs updates to tags, digital signing of the tags as necessary, placing or moving tags to the appropriate location in client computer 110, and verification of tags.

Tag prototype database 240 stores tag prototypes and responds to requests for tag prototypes by returning the requested tag prototype.

Tag instance database 250 stores instances of tags, i.e. versions of tags that have been created and associated with client software components, and responds to requests for tag instances by returning the requested tag instance to the requesting service.

Figure 3:
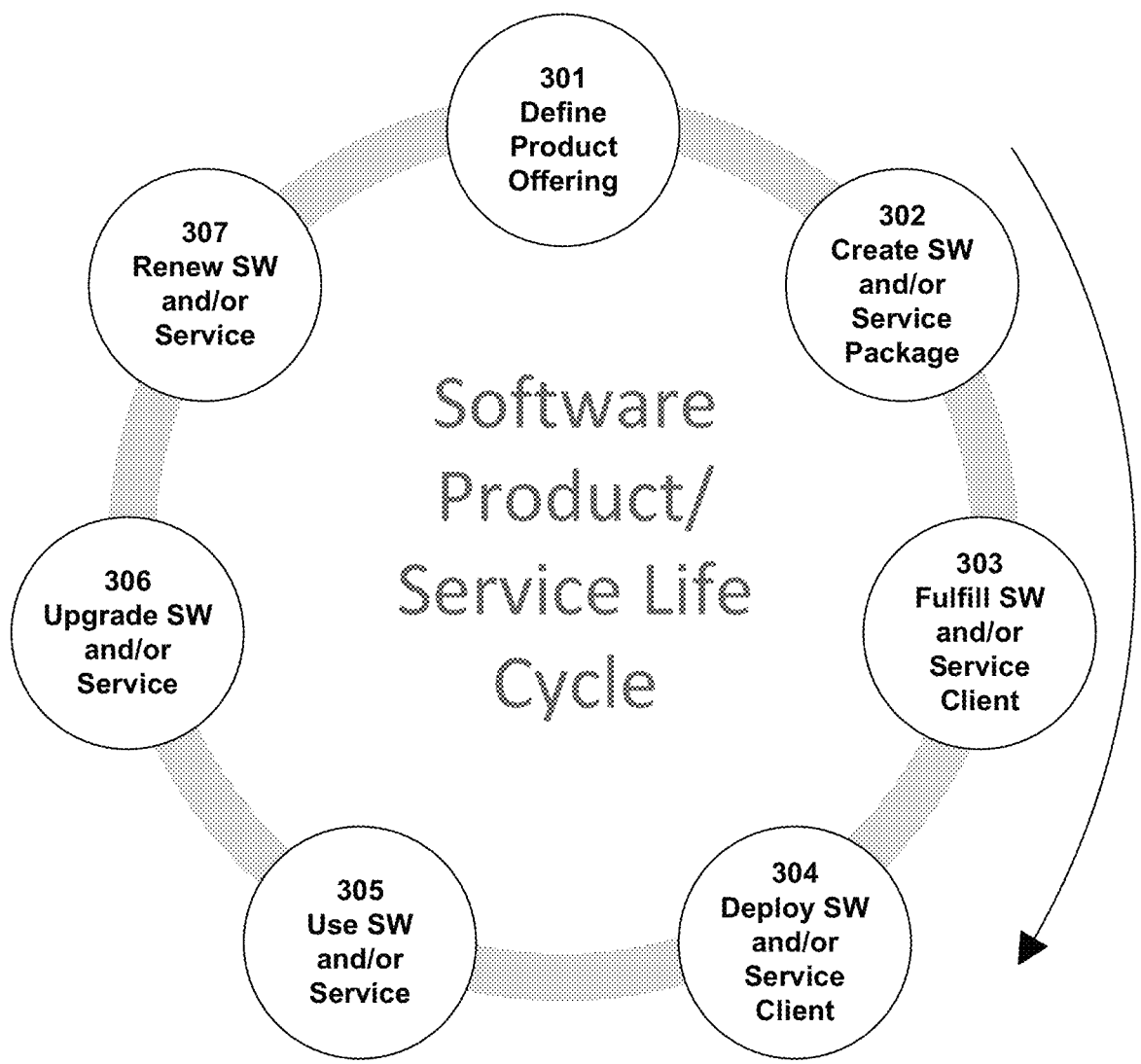
FIG. 3 illustrates a seven step life cycle of a software product or service.

FIG. 3 illustrates a seven step life cycle of a software product or service. It may be appreciated by one skilled in the art that a unique aspect of the subject invention is its ability to create a tag that corresponds to an instance of a client software component and to maintain and update the tag at each step in the life cycle of a product or service.

An initial step 301 or phase of the life cycle is to define a product offering. It may be appreciated that product offering refers to the definition of software components, including client software products, that make up the product or service. Further, as used herein a product offering includes client software components whose use is governed by entitlements. Additionally, when the term product is used it may also refer to a service, for example a ERP service provided under a SaaS model or to software provided using an on premise model. During this step, usually carried out by product management staff using specialized software tools, a software product offering is defined. This step includes defining the client software components that are to be distributed to users. This may include defining configuration information, add-on features, meters, suites etc. At this time, a software tool may be used to define the configuration and the set of tags associated with client software components included in the product offering.

It may be possible, with the appropriate tag architecture, i.e. tag data model and design, to create a one-to-one or many-to-one correlation between SaaS Entitlements and tag prototypes. Doing so will allow a unique tag that is generated later in the life cycle to be associated with an entitlement. If it is possible to create this association, the information generated as a result can be invaluable when deployments and usage are reconciled with entitlements during the product or service usage cycle.

At step 302 a distribution is created and configured, i.e. the downloadable version of the client software component, also referred to as a software package. As a distribution is built prior to shipping to users, a "build tag" is created, typically by a tag creation tool. The build tag is created for inclusion in a distribution that is shipped to one or more client computers. A build tag refers to the initial tag included in or provided with a client software component; the build tag is subsequently modified as a result of events that occur during the lifecycle of service 120, to include deployment information.

As part of this step, entitlements may be associated with the product or service package. Examples of entitlements include:

A time period for use of a client software component.
A time period of support for a client software component.
A period during which content such as book, movie, audio, or anti-virus profiles, may be accessed.
The maximum number of users to which the client software components can be provided, or fulfilled.

The entitlement is subsequently granted through an entitlement transaction, described in further detail hereinbelow, that entitles a user to be licensed to use a client software component. Typically, this entitlement transaction is uniquely identified by a entitlement identifier. Thus, an entitlement by a user to use a software client component may also be uniquely identified. Tagging the client software component with an entitlement identifier that is associated with the unique entitlement enables the tag and the entitlement to be associated throughout the life cycle of the client software component. This structure allows the entitlement to be traced and audited, which is especially helpful in the case that a grantee has many instances of the same kind of entitlement acquired via different means.

Next, at step 303, the software is fulfilled, i.e. provided to client computer 110. Fulfillment may be performed in a variety of ways. For example, an end-user may receive the client software component and tag fulfilled together either via an electronic software delivery (ESD) service, for example by downloading the software from a website; alternatively the software may be pushed, i.e. transmitted, to the end-user in some electronic fashion. In addition to ESD, software may be fulfilled, i.e. delivered, on "hard" media, for example on a CD, DVD or USB drive.

Figure 4:
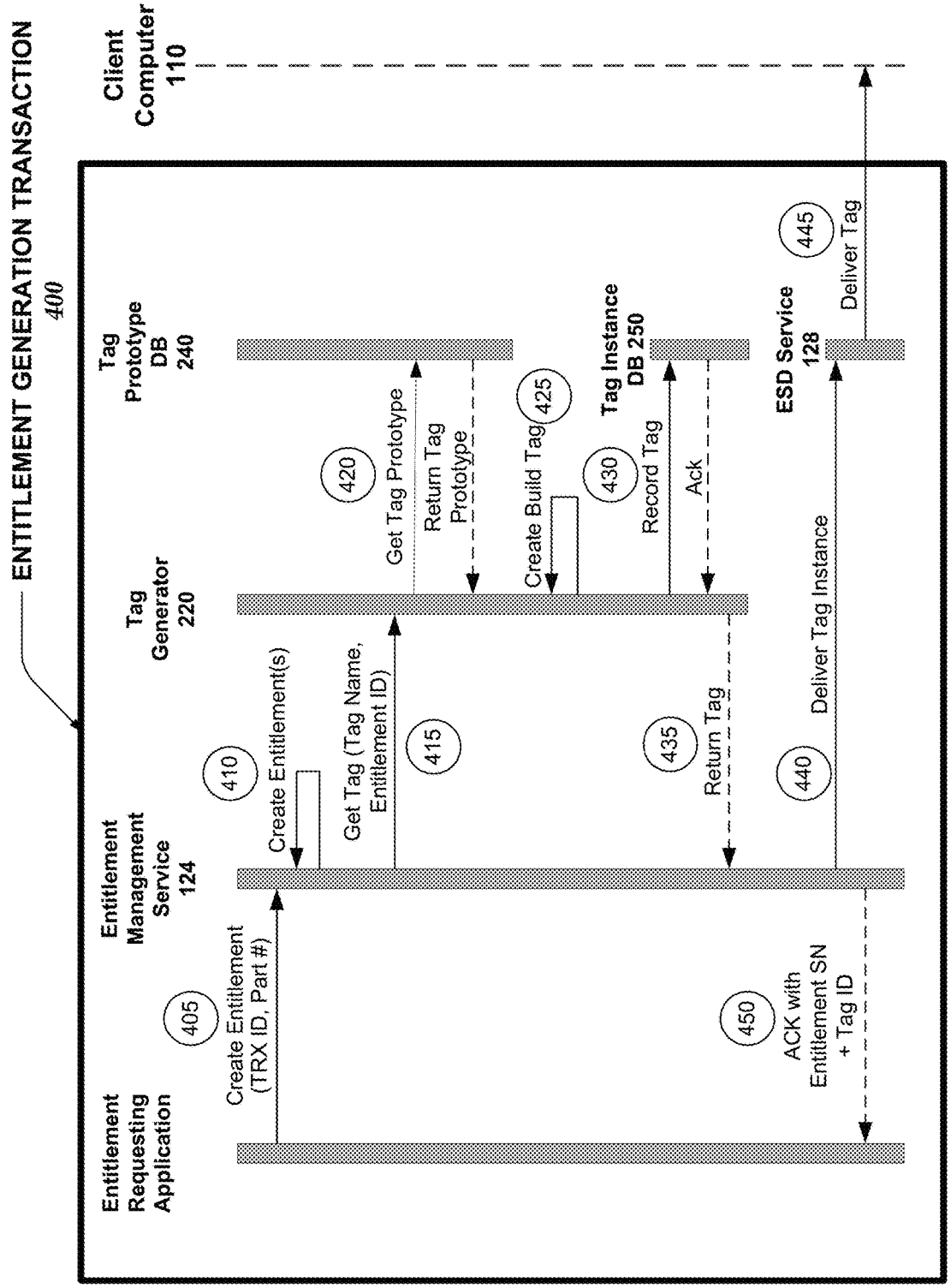
FIG. 4 illustrates an entitlement generation transaction in which an entitlement is created, and the appropriate tags are generated and provided to the client computer for subsequent use.

As a result of a business transaction, one or more entitlements are created through a create entitlement transaction, as illustrated in FIG. 4, and described hereinbelow. An example of a business transaction which results in an entitlement being created is the sale or license of a software product that includes client software component 110. The sale and its corresponding business transaction can be considered as an "entitlement granting event." Typically, such a transaction has a unique ID, separate from the ID of the entitlement itself, which may be included in a tag.

As part of this step, tag management service 126 delivers to client computer 110, an appropriate tag, as described with reference to FIG. 4.

In one embodiment, service 120 includes only the above-mentioned build tag with distributions, with each build tag modified, relative to its corresponding tag prototype, to indicate the build version, a unique serial number and possibly other associated information such as the time and date of the build, build authorization information. This enables the end-user and/or service to identify precisely the software component product which is eventually used within the customer infrastructure. In this embodiment, the build tag and its corresponding client software component 110 is not associated with an entitlement. This approach may be useful, for example, in the case where client software component 115 is licensed for unlimited use throughout an organization, i.e. a form of site license, and it is not important to track or manage entitlement at a granular level.

In a second embodiment, a build tag is created and entitlement information is included in the build tag. In this second embodiment, the tag, will include the entitlement ID, the entitlement transaction ID, or both. In this second approach, the build tag included with the client software component 110 distribution includes the entitlement information within the build tag. Associating a client software component with an entitlement, via its tag enables service 120 to manage usage policies, as defined by the entitlements, for the client software component.

Until client software component 115 is installed and resident in client computer 110, client software component 115 is not yet deployed, i.e. is not yet ready to put into use. Thus, deployment is necessary prior to use. As part of deployment, an associated tagging transaction is performed, as illustrated in and described in reference to FIG. 5. Deployment may be accomplished in a variety of ways. In one approach, the end-user deploys the client software component 115 and tag on client computer 110 using a deployment tool that is normally included with the client component software 115. An example of such a deployment tool is INSTALLSHIELD by Flexera Software LLC, which is commonly used by software vendors. During this process, the tag may have deployment information added, such as time, location, etc., as discussed with reference to FIG. 5. As a result, the tag is transformed into a uniquely identifiable "deploy tag", i.e. an updated version of the tag that includes deployment information.

Next, at step 305 the client software is placed into operational use, i.e. it is used by an end-user. A continuous period of use by a user is referred to as a session. There are two tag events or transactions associated with a session during the deployment phase: a session initiation transaction, described in further detail with reference to FIG. 6 hereinbelow, and a session termination transaction, described in further detail with reference to FIG. 7 hereinbelow.

Typically, a tag includes an attribute that defines characteristics of product usage, as shown in Table 1 hereinabove. During deployment, this attribute may be updated with information, which when collected or harvested, enables service 120 to execute algorithms that can measure level of activity or usage.

At step 306 of the life cycle the software or the service may be upgraded, for example by providing patches to client software component 115. Patching or upgrade of client software component 115 may occur either by a standalone process supplied with the client software component, or by the service provider as a remote process into the end-user's environment. If a patch or upgrade to client software component 115 is performed, then the corresponding tag is updated to reflect the changes to client software component 115. These changes to the tag are also recorded within service 120.

The capabilities of service 120 may change over time such that client software component 115 may have to be updated in order to support the change in capabilities. The tag may be used as a verification mechanism that allows service 120 to enforce a policy that may be in place if exceptions are detected by the verification process.

At step 307 the client software may be renewed, i.e. its license may be extended to allow for continued use. Acquiring a renewal via a business transaction, e.g. purchasing an additional 12 months of use, will result in the issuance of a new entitlement which can be associated with previous renewals and even perhaps other entitlements such as license entitlements. A service can consist possibly of SaaS, maintenance, content for some application (signatures for security issues, mapping updates, document updates etc.) or possibly combinations thereof.

The resulting action causes a new entitlement, linked to the original entitlement, to be recorded by EMS 124.

While the terms build tag, fulfilled tag, and deploy tag are used to refer to a tag associated with client component software 115, in a preferred embodiment each of these refer to the same data structure; thus a single tag is maintained for a unique instance of client software component 115. In other embodiments, these terms may refer to different tags that are maintained in client computer 110.

Entitlement Generation Transaction

FIG. 4 illustrates an entitlement generation transaction 400, performed at fulfill software step 303, in which an entitlement is created, and the appropriate tags are generated and provided to the client computer for subsequent use.

At step 405 an entitlement requesting application, i.e. any application that licenses software based on entitlements for use by an end-user, creates an entitlement request. This is typically a message that includes information such as a unique transaction identifier, referred to in FIG. 4 as TRX ID, and an entitlement part number, referred to as Part #, that identifies that client software component for which the entitlement is requested.

At step 410 entitlement management service 124 creates and stores an entitlement record in an entitlement database. While the operation of entitlement management service 124 is generally outside the scope of the subject invention, the steps of creating an entitlement is fundamental to the entitlement generation transaction 400 and is discussed in that context. The entitlement specifies the usage terms that are being licensed and includes transaction information such as the TRX ID and Part # that enable this instance of an entitlement to be uniquely identified. The action of creating an entitlement at step 410 enables a sequence of tag management transactions, described in reference to FIGS. 5-7, to be performed during deployment client software component 115. Thus, taken together FIGS. 4-7 specify a sequence of tag management transactions that enable management of entitlements for client software components across all steps of the service or software life cycle.

At step 415 entitlement management service 124 issues a request to tag generator 220 to get a tag that corresponds to the specified entitlement. It may be appreciated that more than one tag may be required to fulfill the request thus the term tag at step 415 and subsequent steps may refer to more than one tag. As a consequence, at step 420 tag generator 220 requests a tag prototype from tag prototype database 240 and tag prototype database returns the requested tag prototype.

At step 425 tag generator 220 creates a build tag from the returned tag prototype by adding passed parameters generated during the entitlement creation transaction. Parameters may include a transaction number, entitlement ID, and the like.

At step 430 tag generator 220 records the newly created build tag, which is an instance of a tag, in tag instance database 250, which returns an acknowledgement. Tag generator 220 then returns the build tag, at step 435, to entitlement management service 124.

At step 440 EMS 124 provides the build tag to ESD service 128 for fulfillment to client computer 110.

At the conclusion of this step either a "fulfilled" tag is associated with the entitlement transaction, or a static build tag is created, linked to the entitlement transaction, and recorded. The fulfilled or build tag is delivered to client computer 110 along with client software component 115.

Figure 5:
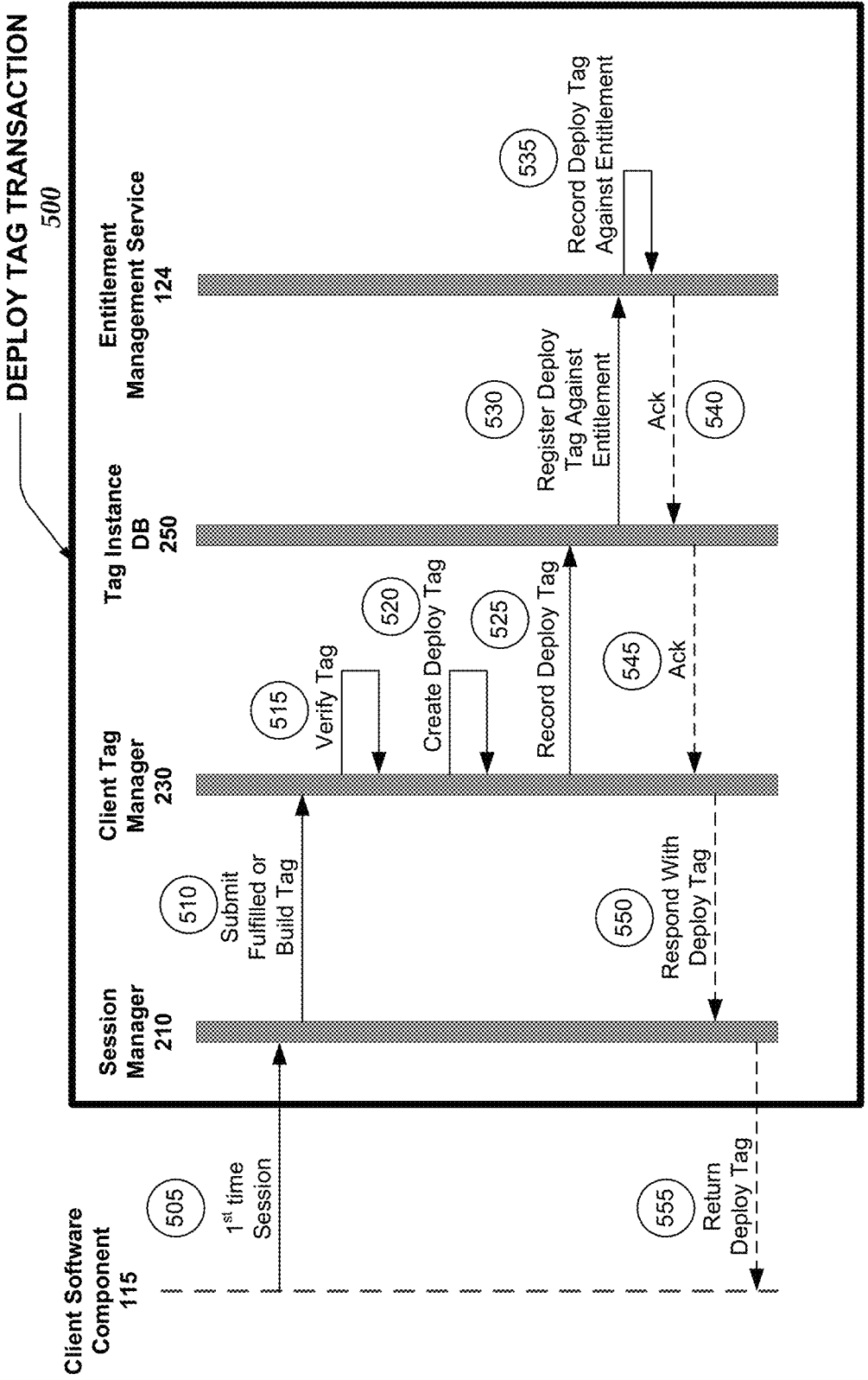
FIG. 5 illustrates a transaction performed by the tag management service to transform a "Fulfilled" or "Build" tag to a "Deployed" tag.

FIG. 5 illustrates a transaction performed by tag management service 126, performed at step 304 of FIG. 3, to transform a fulfilled or build tag to a deploy tag.

To initiate a first user session of client software component 115, client software component 115 initiates deploy tag transaction 500, by sending a 1st time session request 505 to session manager 210. The sequence of steps performed as part of deploy tag transaction 500 ensure that the Fulfilled or Build tag, which is now resident on the client computer is transformed into a "deploy" tag by adjusting the appropriate tag attributes, e.g. unique tag identifier, deployment information, time stamp, signature, as indicated in Table 1 hereinabove.

At step 510 session manager 210 obtains the build or fulfilled tag from client computer 110 and submits it to client tag manager 230. Client tag manager 230 verifies the received tag against the corresponding tag in tag instance DB 250 at step 515. At one level, verification ensures that the client software component and tag have not been tampered with by checking whether the tag obtained from client computer 110 is identical to the tag stored in tag instance DB 250. Verification can also check the tag relative to predefined criteria such as: valid tag attribute values for the software component per Table 1, valid signature, and the like. Verification also identifies exceptions such as whether usage is in conformance with the licensed entitlement. This verification process is performed for each transaction, as described in reference to FIGS. 5-7, after successful deployment of client software module 115. Thus, discrepancies are identified as part of each usage event associated with client software module 115 as long as it remains deployed.

As part of verification client tag manager 230 may determine if the client software component is of the correct version, patch, etc., for use with the current version of service. At step 520 the fulfilled or build tag is modified by the service, by adding deployment information such as the date and time of deployment, and replaced on the client computer to create a deploy tag. The previous fulfilled or build tag is archived on the client computer.

At step 525 client tag manager 230 records the event of tag modification to the newly created deploy tag in tag instance database 250.

At step 530 tag instance database issues a message to entitlement management service 124 to register, or record, the deploy tag against, or in association with, the corresponding entitlement.

At step 535 entitlement management service 124 records the deploy tag against the entitlement.

At step 540 entitlement management service 124 provides an acknowledgement of having successfully (or unsuccessfully) recorded the deploy tag against the entitlement.

At step 545 tag instance database 250 conveys the acknowledgement to client tag manager 230.

At step 550 client tag manager 230 responds by providing the deploy tag to session manager 210 which in one embodiment, at step 555, provides it to client software component 115 to be stored for further use. In other embodiments, at step 555 session manager 210 stores the tag directly in client computer 110.

Figure 6:
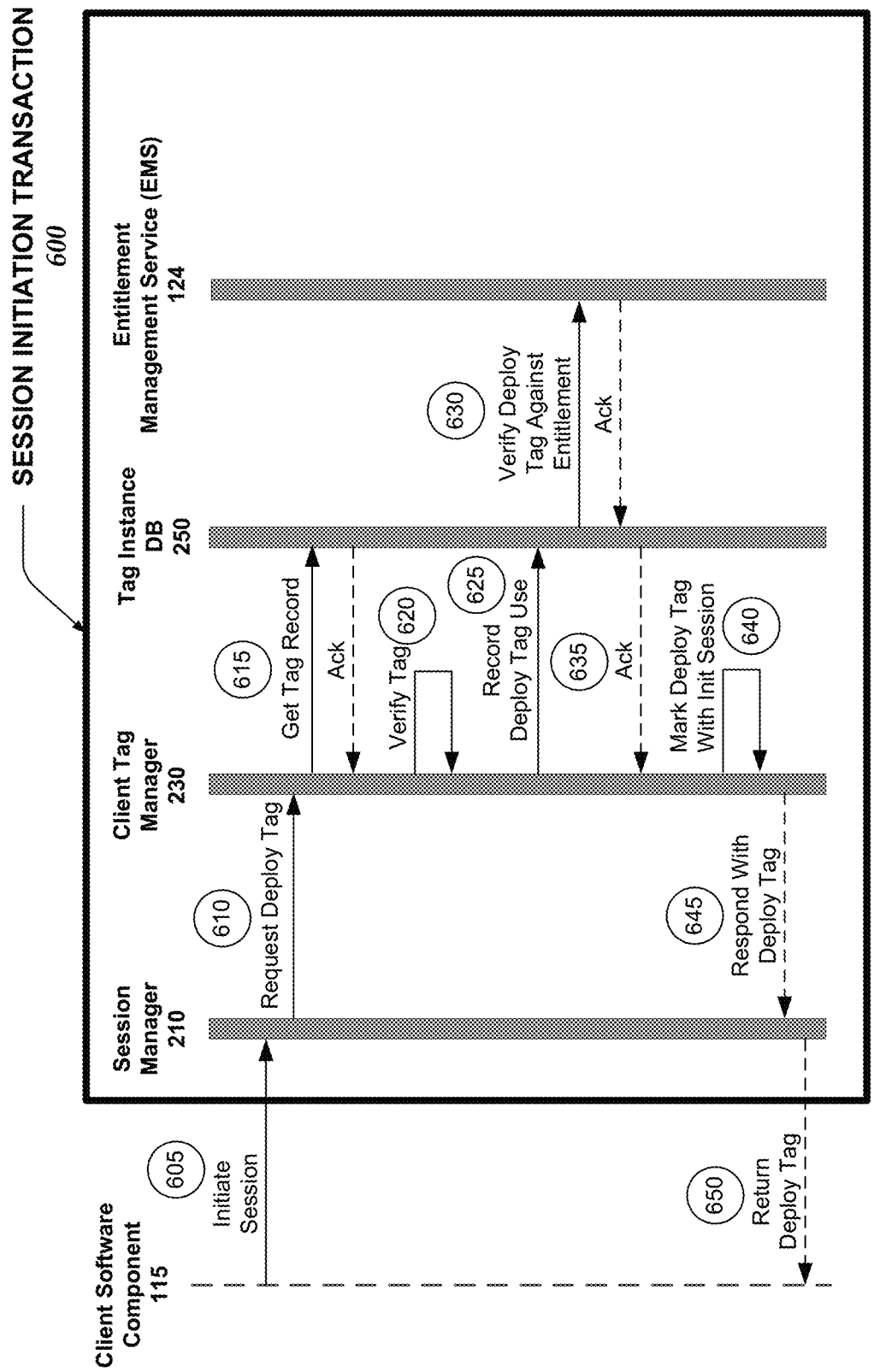
FIG. 6 illustrates a illustrates a session initiation transaction performed when opening a session in which a client software component is to be used.
Figure 7:
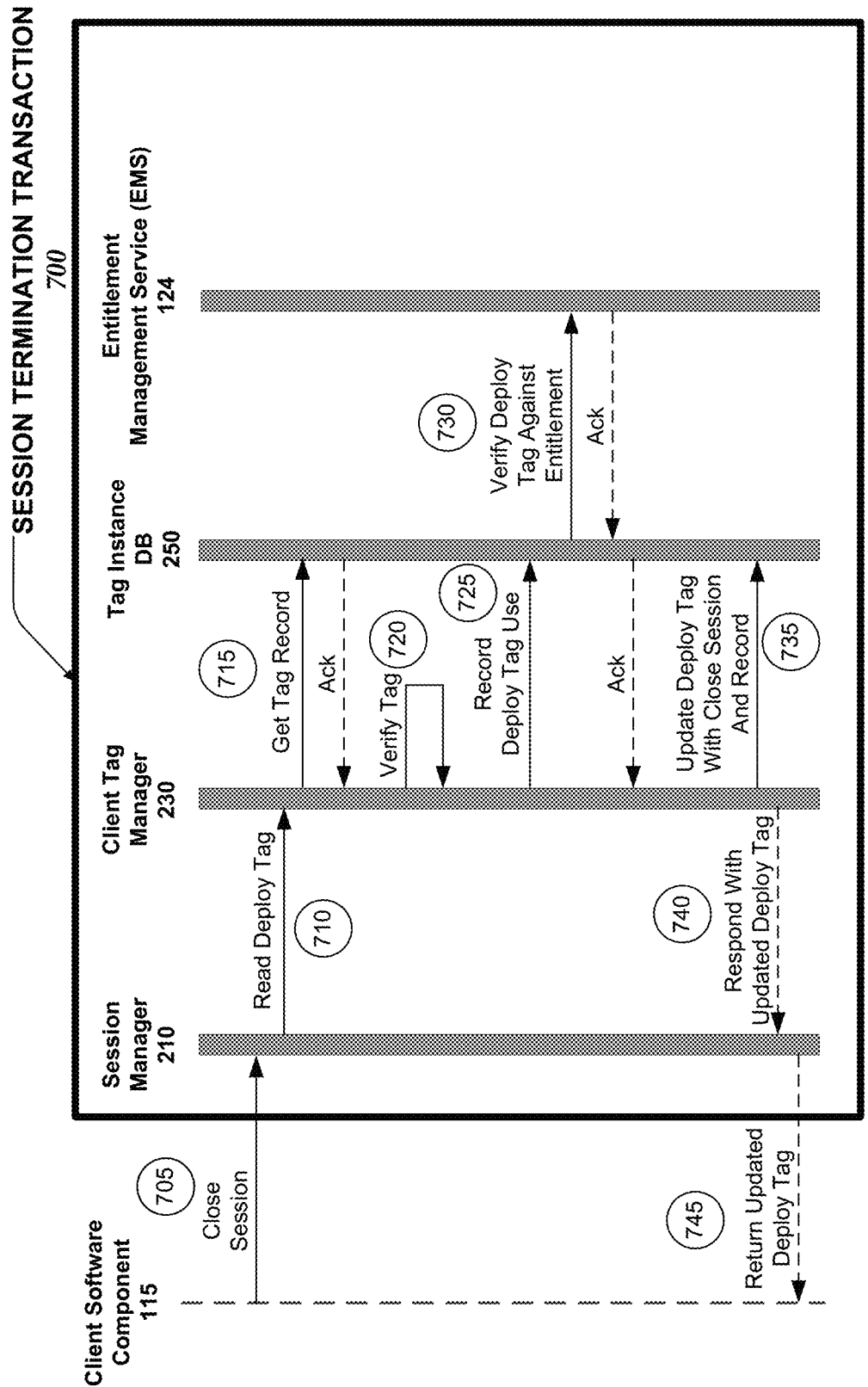
FIG. 7 illustrates a session termination transaction performed when closing a session in which the client software component was used.

Generally, there are various ways in which an updated tag may be provided or stored in client computer 110, at step 555 and also at step 650 of FIG. 6, and step 745 of FIG. 7. In one embodiment, service 120 has direct access to the location of the tag in the nontransitory memory or disk of client computer 110 (via a tool such as FTP). Further, in these mirror steps, the previous version of the tag is placed in an archive in the client environment to allow a SAM tool in the client environment to "harvest" usage information on the client side for the end-user if requested. It may be appreciated that there is one valid tag for client software component 115 at any point in the life cycle.

At the conclusion of the transaction depicted in FIG. 5 and represented by step 304 of FIG. 3, a deploy tag, associated with an entitlement transaction, has been created and recorded within the tag management service 126 and stored in client computer 110 for subsequent use.

Session Initiation

FIG. 6 illustrates a session initiation transaction 600, which is executed as part of step 305 of FIG. 3. At session initiation, client software component sends a deploy tag to session manager 210 at step 605 as part of the session preamble/setup.

At step 610 client tag manager session manager 210 requests the deploy tag from client tag manager 230 which in turn, at step 615 gets the deploy tag record from tag instance database 250.

At step 620 client tag manager 230 verifies the tag, as described with reference to FIG. 5 hereinabove, with the additional step of verifying the tag against its associated entitlement in EMS 124. At step 625 client tag manager 230 records the event in the tag instance database by updating the deploy tag with deployment details. As this is the first usage "event" for client software component 115, at a minimum, the deploy tag usage identifier, included in Table 1 above, is updated to indicate that client software component 115 has been "used."

At step 630 tag instance database 250 verifies the deploy tag against entitlement. In one embodiment, if the deploy tag contains the entitlement ID, i.e. it was not originally a static build tag, then it will contain an entitlement ID. In this case, EMS 124 verifies that the deployment has an entitlement that is valid; verifying validity may include determining that the entitlement has not expired, or that the maximum number of allowed users hasn't been exceeded, and thus use by client software component 115 is entitled. As part of this step tag instance database requests information about the entitlement associated with the deploy tag in order to verify the tag against the entitlement. Further, tag instance database issues an exception message to EMS 124 if an exception relating to the entitlement is detected, i.e. if the usage conditions have been violated by client software component 115.

At step 635 tag instance database acknowledges that the deploy tag has been verified against an associated entitlement.

At step 640 client tag manager modifies the session status attribute of the deploy tag with "Init Session" to indicate that a session has commenced.

At step 645 client tag manager responds to the read request by providing the deploy tag to session manager 210 which in turn, at step 650, provides the updated deploy tag to client software component 115 for subsequent use. There are various mechanisms for providing the deploy tag to client software component 115.

Should the session be closed outside of a client requested termination, the tag will reflect this state in both client and as well as in the server-side tag management system. The policy for managing this state is outside the scope of the subject invention.

Session Termination

FIG. 7 illustrates a session termination transaction 700 performed when closing a session in which client software component 115 was used. Session termination transaction 700 is performed as part of step 305 of FIG. 3. The session termination transaction 700 may be initiated by either the client software component 115 as a result of some action in the client side of the client/service interaction, or may be initiated by the service side of the session, i.e. by service 120, as a result of a service event. In any event, however session termination transaction 700 may be initiated, the termination sequence commences with a close session request at step 705 issued by client software component 115. The deploy tag is read or obtained by session manager 210 from client computer 110 at step 710 as part of an orderly session termination sequence. At step 715 client tag manger 230 gets the corresponding tag from tag instance database 250 then, at step 720 client tag manager 230 verifies the tag.

At step 725 the close session event is recorded in tag instance database 725, and the deploy tag is verified against the entitlement at step 730. At step 735 the deploy tag is updated with session close information such as time stamp and status "Closed" and recorded to tag instance database 250. Thus, at step 735 the update to the tag itself is performed, which will then be stored in client computer 110. This ensures that the same session termination information exists on both the client side and the service or server side so that at the next session start, the client-side and service/server side tags can be compared to verify that they are the same. This verification mechanism enables tag management service 126 to ensure that both client software component 115 and its tag remain unchanged between sessions. For instance if someone, e.g. a duplication program, copied client software component 115 and its corresponding tag to another client computer, the service would be able to detect that there were now two instances, at least when the second instance was started. Assuming that the associated entitlement did not allow for duplication, service 120 could take an appropriate action upon detecting the duplication.

At step 740 the updated tag is returned to session manager 210 which in turn provides the updated tag to client software component 115 at step 745.

As previously described, there are various mechanisms by which session manager 210 may provide the updated tag to client software component 115. As with all events that result in a modification to or updating of the tag, the previous version of the tag is placed in an archive in the client environment to allow a software asset management (SAM) tool running in client computer 110 to "harvest" usage information if requested.

At the conclusion of a successful session termination transaction 700 the deploy tag associated with an entitlement transaction has been created and recorded by service 120 and also placed in client computer 110 for subsequent use. Thus, when a new session is initiated by client software component 115 at a later time the previous session information has been persisted between sessions in both client software component 115 side within the stored tag and on the service side, i.e. in service 120, within tag instance database 250. The information may be used to authorize a continuous logical service session across multiple sessions (if required), as well as prevent unauthorized access service 120 at session initiation by a client software component that does not carry the correct communication termination data in the tag as the result of a previous orderly communication session termination.

Figure 8:
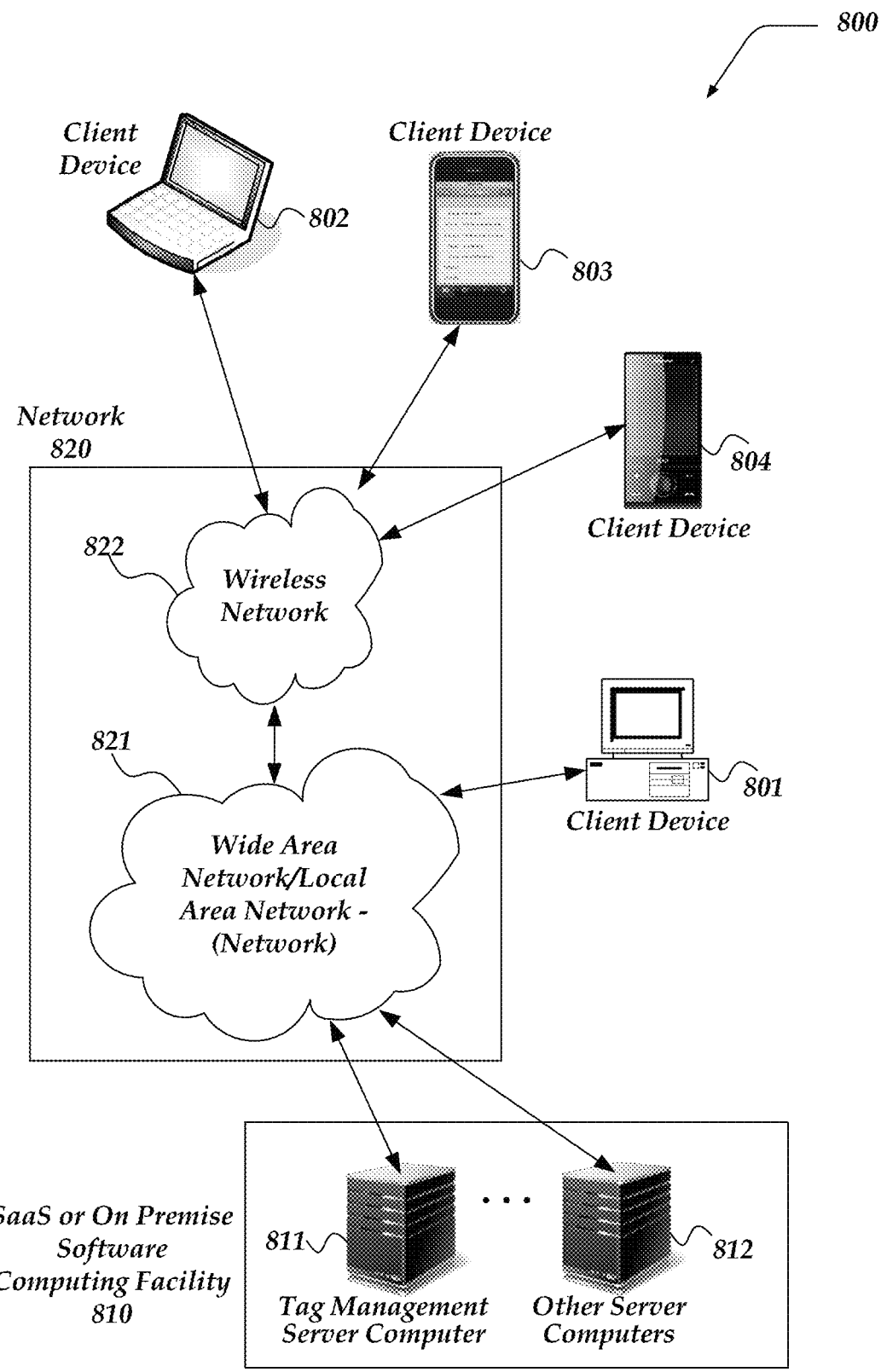
FIG. 8 is a system diagram that illustrates one exemplary environment in which the invention may be practiced.

FIG. 8 is a system diagram that shows one exemplary environment in which the invention may be practiced. Not all of the components illustrated may be required to practice the invention, and variations in the arrangement and types of the components may be made without departing from the spirit or scope of the invention. As illustrated in FIG. 8, system 800 includes a network 820 that includes a wide area network ("WAN")/local area network ("LAN")—(network) 821, a wireless network 822, several client devices 801-804, and a SaaS or On Premise Software computing facility 810, referred to henceforth as computing facility 810. Computing facility 810 includes a tag management server computer 811 and one or more other server computers 812.

Client devices 801-804 illustrate multiple embodiments of client computer 110, each of which connects to network 820. Network 820 is one embodiment of network 130. Computing facility 810 illustrates one embodiment, or implementation, of service 120 in which tag management service 126 is implemented by tag management server computer 811 and the other services in service 120 run on one or more other server computers 812.

Generally, client devices 801-804 include any computing devices capable of receiving and sending messages over a network, such as network 820. Client devices 801-804 include personal computers, multiprocessor systems, microprocessor-based or programmable consumer electronics, mobile devices such as mobile telephones, smart phones, display pagers, tablet computers, handheld computers, laptop computers, wearable computers, or the like.

Client devices 801-804 includes a computer processor (CPU) and nonvolatile data storage for storing program code and data. Data storage may include virtually any mechanism usable for storing and managing data, including but not limited to a client software component, a file, a folder, a document, a web page or an application, such as a database, digital media including digital images and digital video clips, and the like.

Data storage may further include a plurality of different data stores. For example, data storage may store updated tags, archived tags and software and tag usage data. Further, data storage may also include network storage or cloud storage in which the physical storage media is accessed across a network.

Tag management server computer 811 further includes a network interface, also referred to as a network adapter, network interface card or transceiver, for transmitting and receiving digital data across network such as wireless network 822, or network 821.

A Web-enabled client device can communicate across the Web. It may include a browser application that is configured to receive and to send web pages, web-based messages, or the like. The browser application may send, receive and display graphics, text, multimedia, or the like, employing a network protocol such as Hypertext Transfer Protocol (HTTP) and/or wireless application protocol (WAP).

Client devices 801-804 may include client application programs that send and receive content to/from other computing devices. Examples of application programs include calendars, browsers and email clients and so forth. Client devices 801-804 may be configured to receive via an electronic software distribution (ESD) service such as ESD service 128 a client software component 115 that implements a tag management system such as that described in FIGS. 1-7 hereinabove.

Wireless network 822 is configured to couple client devices 802-804 with network 821. Wireless network 822 may include any of a variety of wireless networks that provide a connection for client devices 802-4. Such networks may include the wireless Internet, mesh networks, wireless LAN (WLAN) networks, cellular networks, or the like. Wireless network 822 may further include network devices such as gateways routers, or the like. In essence, wireless network 822 may include virtually any wireless communication device or mechanism by which enables information to travel between client devices 802-804 and another computing device, network, or the like.

Network 821 is configured to connect computing facility 810, and client device 801 with other computing devices, including through wireless network 822 to client devices 802-804. Network 821 may include the Internet in addition to local area networks (LANs), wide area networks (WANs), direct connections, combinations thereof or the like.

Computing facility 810 illustrates one embodiment in which two or more network computing devices provide the various features, services and capabilities of service 120, and which enable the distribution and deployment and management of client software components to client computers 801-804 for execution by users and operation of a tag management service for identifying, tracking and managing the client software components across a product or service life cycle. There are many alternative embodiments for providing the components of service 120 across multiple servers. For example, each of the components of service 120 may be implemented in one or more distinct server computers. As illustrated in FIG. 8, in one embodiment service 120 is implemented as one or more server computers 811 that implement tag management service 126 and one or more other server computers 812 that implement the remaining components of service 120.

While other computer servers 812 are within the scope of system 800, the subject invention is generally focused on tag management service 126, which in system 800 is implemented or embodied by tag management server computer 811. Thus, the following discussion of server configuration will be limited to that of tag management server computer 811, although generally the same principals and design features may be applied to other server computers 812.

Devices that may operate as tag management server computer 811 include, but are not limited to personal computers, desktop computers, multiprocessor systems, microprocessor-based or programmable consumer electronics, network PCs, servers, network appliances, and the like.

Although tag management server computer 811 is illustrated as a distinct network device, the invention is not so limited. For example, a plurality of network devices may be configured to perform the functions of tag management server computer 811. One such configuration is a "server farm" that includes multiple server computers operating cooperatively, each performing some of tag management server computer 811 server functions. One embodiment of the software modules that perform tag management server computer 811 server functions is described with reference to FIG. 2 above.

In certain embodiments, tag management server computer 811 functions may be provided by a cloud computing facility in which the services, features and functions ascribed herein to tag management server computer 811 are delivered as a service over a network, such as the Internet, rather than by a specific server or cluster of servers.

Tag management server computer 811 is capable of running application programs ("applications"). Applications that may be run by tag management server computer 811 include transcoders, database programs, customizable user programs, security applications, encryption programs, VPN programs, web servers, applications servers, account management systems, and so forth. Applications run by tag management server computer 811 may also include a session manager, a tag generator, a client tag manager, a database manager that manages a tag prototype database and a tag instance database and other applications and processes such as those described below with reference to FIG. 2.

Tag management server computer 811 provides web services which include any of a variety of network services that are configured to provide content, including messages, over a network to another computing device. Thus, web services may include an application server, a web server, a messaging server, a File Transfer Protocol (FTP) server, a database server, a content server, or the like. Web services may provide the content including messages over the network using any of a variety of formats, including, but not limited to WAP, HDML, WML, SGML, HTML, XML, cHTML, xHTML, JSON, REST, SOAP or the like. Web services may also include server-side scripting languages such as PHP, Python, and Java servlets. Web services may also include the server side of the Ajax web development method that enables a server to asynchronously respond to Ajax requests.

Tag management server computer 811 includes a computer processor (CPU) and nonvolatile data storage for storing program code and data. Data storage may include virtually any mechanism usable for storing and managing data, including but not limited to a file, a folder, a document, a web page or an application, such as a database, digital media including digital images and digital video clips, and the like.

Data storage may further include a plurality of different data stores. For example, data storage may include a tag prototype database and a tag instance database and other databases such as those described below in conjunction with FIG. 2. Further, data storage may also include network storage or cloud storage in which the physical storage media is accessed across a network.

Tag management server computer 811 further includes a network interface, also referred to as a network adapter, network interface card, or transceiver, for transmitting and receiving digital data across network such as wireless network 822, or network 821.

Blockchain Embodiments

While the preceding embodiments, described with reference to FIGS. 1-8, are concerned with the use of tags for tracking the use and status of entitlements of software components over a life cycle, blockchain embodiments generalize this to cover all entitled products and services, referred to hereinbelow simply as entitled products, which include software components. Further, the underlying technology is provided by blockchains, blockchain transactions, ledgers and smart contracts which together implement the tag and tag management features previously discussed. Generally, entitlements between vendors and end-users are implemented and managed using blockchain technology. Blockchain capabilities, including an immutable distributed database, and intelligence support entitlement transactions between vendors and end-users of entitled products. The use of blockchain technology solves the previously discussed issue of trust as well as provides a systematic approach managing usage of an entitled product through the unique combination of entitlement transactions and smart contracts.

Figure 9:
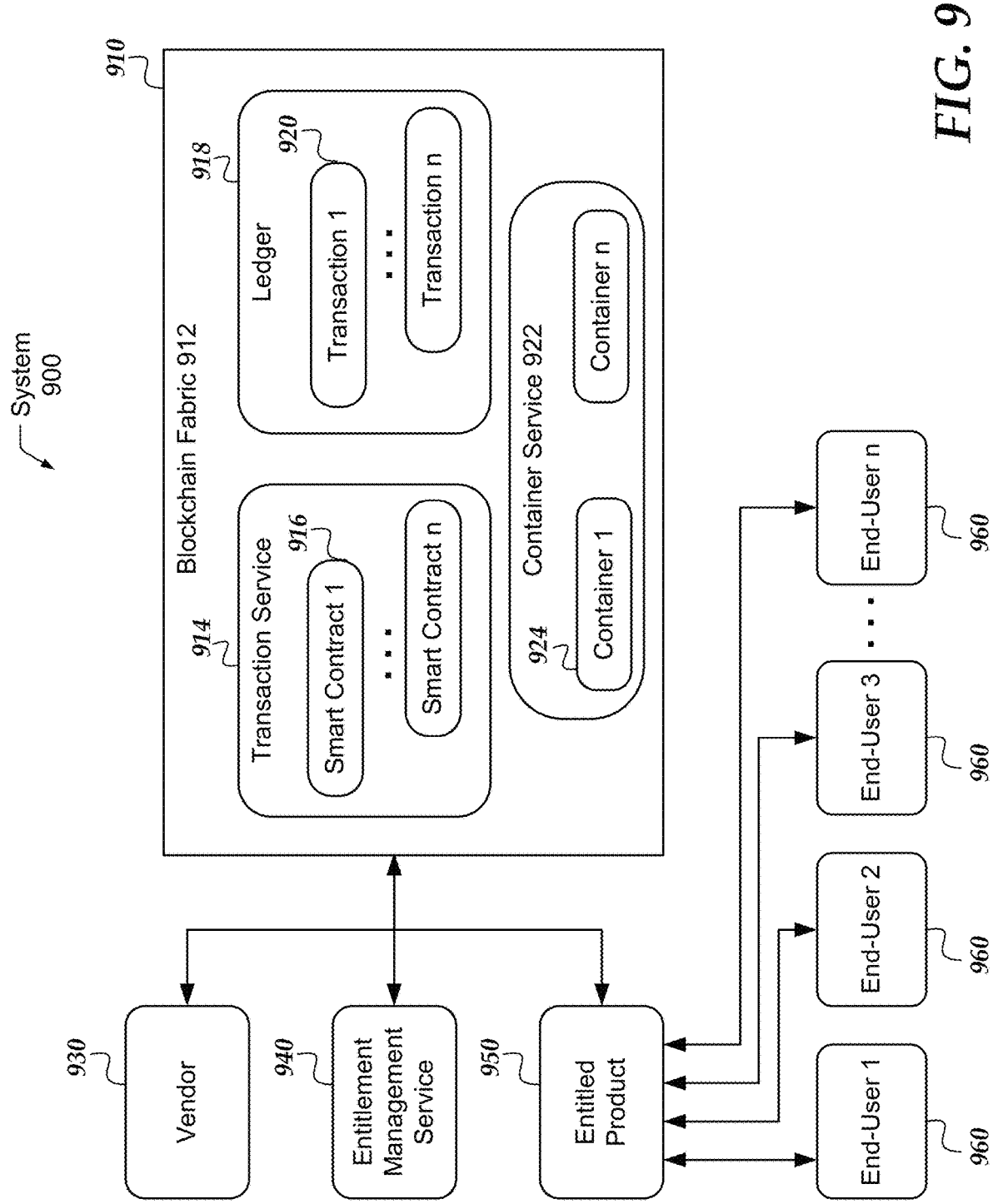
FIG. 9 illustrates an embodiment of a system that performs entitlement management using blockchain technology.

FIG. 9 illustrates an embodiment of a system 900 that performs entitlement management using blockchain technology. System 900 includes a variety of components, including a blockchain 910, a vendor infrastructure 930, an entitlement management service (EMS) 940, one or more entitled products 950, and one or more end-users 960.

Blockchain 910 is a platform for distributed ledger solutions. In certain embodiments, blockchain 910 is accessed using a blockchain fabric 912, which is a modular, extensible, software architecture or framework that provides a foundation for developing blockchain applications. Blockchain fabric 912 provides some or all of the following features: a transaction service 916 that uses smart contracts 916 to implement entitlement transactions and logic, a distributed ledger 918 that may be replicated across many network participants and which stores data for each transaction 918, also referred to as a block. Thus, ledger 918 maintains a history of all transactions. Blockchain 910 further includes a decentralized architecture, and data encryption. Information recorded or added to blockchain ledger 918 is append-only and uses cryptographic techniques that guarantee that once a transaction has been added to ledger 916 it cannot be modified. Information recorded to ledger 918 is thus immutable.

There are various blockchain implementations. Generally, system 900 can be implemented using any of the major blockchain implementations. In particular, blockchain 910 can be implemented using the HYPERLEDGER FABRIC, which is an open source collaborative implementation of blockchain technology hosted by the LINUX Foundation and can be found at www.hyperledger.org. Documentation on HYPERLEDGER FABRIC is available at https://hyperledger-fabric.readthedocs.io.

The subject invention extends blockchain fabric 912 by adding a container mechanism, implemented by container service 922, that enables transactions 920 that refer to the same original, or base, entitlement to be associated using links.

Vendor 930 is any computer system or computer system infrastructure that enables an entity to sell entitlements to use products and/or services under conditions specified by an associated entitlement. Vendor 930 grants an entitlement to use entitled product 950 to a person or entity, i.e. to end-user 960. An entitlement is implemented by blockchain 910 by one or more smart contracts 916 which are registered with blockchain 910 for use with specific entitlements. It may be appreciated that certain products and services are not sold directly by a vendor but are sold by a $3^{rd}$ party reseller, a partner organization, a subsidiary, a distributor or other $3^{rd}$ party sales and fulfillment entity. The specifics of the relationship between a vendor and its resellers is outside the scope of the subject invention and is collectively referred to as vendor infrastructure 930. Vendor 930 may also include a fulfillment service for electronically fulfilling, i.e. providing delivery for, entitled product 950. For example, if the entitled product is computer software then vendor 930 may include an electronic software delivery service such as electronic delivery service 128. Such a fulfillment service may also include provisioning of software by a SaaS/Cloud service in which of client-side software is "pushed" to the client's infrastructure.

EMS 940 manages entitlements that are sold or otherwise provided end-user 960 by vendor infrastructure 930. EMS 940 is similar to EMS 124 with the major difference being that EMS 940 interacts with blockchain 910 rather than tag management service 126 to manage entitlements. As discussed hereinbelow with reference to FIG. 10, EMS 940 interacts with blockchain 910 using transactions that are in the form of request/response messages.

Entitled product 950 refers to a product or service for which an entitlement may be sold and managed. The product or service may be tangible such as an automobile or boat, or it may be intangible such as a digital movie or music recording. Generally, with respect to system 900 for managing entitlements the term "consume" refers to the use or experiencing of an intangible asset or resource, such as a song; and the term "use" refers to the use of a tangible product such as an automobile. The difference being that consuming does not alter the underlying asset whereas using does have some impact on the asset. However, in most cases an action can apply to either an intangible or tangible asset and the term "use" is used. Further, as used hereinbelow the term asset refers to a product or service that may be entitled. While the entitlement itself is also an asset, for simplicity the term asset refers only to the product or service being entitled. In this model, end-user 960 doesn't actually purchase an entitled product; rather they purchase a right or entitlement to use or consume an asset for period of time under specified usage conditions.

Entitled product 950 may be resident in a vendor's cloud infrastructure or may be delivered to the end-user for on-premise use.

End-user 960 refers to the equipment or infrastructure used by a person or entity that purchases an entitlement to use entitled product 950 and that subsequently uses the entitled product 950. Typically, end-user 960 directly interacts with entitled product 950. For example, if entitled product 950 is a music file, then end-user 960 refers to a mobile device or personal computer that plays the music file. Generally, end-user 960 may be implemented by client devices 801-804 of system 800.

It may be appreciated that certain of the components illustrated in FIG. 9 may be provided by the same entity. For example, vendor 930 may also provide EMS 940. Or, for example, if vendor 930 operates a streaming music service then they may maintain entitled product 950, i.e. the music files from their infrastructure. Thus, each of the components of system 900 may be viewed as groupings of functions which may be operated independently of each other or may be co-located in various configurations.

Generally, it is assumed that vendor infrastructure 930, EMS 940, entitled product 950, and end-user 960 refer to computer systems that exchange data messages and are inter-connected on the same business network, with appropriate access and authorization mechanisms. The network may be the public Internet, a private network or other network. The access and authorization mechanisms are not addressed here as they are outside the scope of the subject invention. However, in terms of blockchain technology, the blockchain is permissioned and is typically owned by the vendor.

System 800 is generally an exemplary environment in which system 900 may be practiced with the understanding that computing facility 810 may implement elements of or all of EMS 940, vendor infrastructure 930, and blockchain 910.

Smart Contracts

Smart contracts 916 are general purpose computations or programs that execute in association with ledger 918. They are generally executed by blockchain fabric 912 when a transaction request is received from entitlement management service 940 or from another system component. Smart contracts may be associated with specific types of transactions, e.g. an entitlement transaction or a usage transaction, or with types of entitlements. Generally, a smart contract contains the business logic implemented by a blockchain and governs how the blockchain interacts with other components of system 900. A blockchain smart contract is defined and executed as chaincode.

Chaincode is a program, written in Go, node.js, or another programming language that implements a prescribed interface. Chaincode initializes and manages ledger state through transactions 920 submitted by applications, which in this case are the various components of system 900, namely vendor 930, EMS 940 and entitled product 950.

Smart contracts service two types of message: transactions that change ledge state by adding blocks, and queries, which read ledger state and return requested information.

In the context of system 900, smart contracts 916 execute the processing or business logic associated with entitlement transactions, i.e. they add entitlement transaction data to ledger 918 and implement the logic, or rules, associated with entitlements. Smart contract 916 specifies and enforces an entitlement policy or agreement issued by vendor 930 for use of entitled product 950 by end-user 960.

Thus, when a component of system 910 initiates a transaction with blockchain 910 an appropriate smart contract 916 executes. A data object, referred to as transaction 920, which includes the transaction data is added to ledger 918. In certain embodiments, a blockchain is associated with a single type of entitlement with a single owner, e.g. car leases by a specific company. As described hereinbelow, in other embodiments, a number of associated entitlements can be linked together in a container. Many blockchains may simultaneously operate. Entitlements are referenced using an entitlement unique identifier (EUID). A new blockchain is typically created when a new entitlement, that is not associated with any existing entitlements, is created, as discussed hereinbelow.

Each time a lifecycle entitlement event occurs a transaction executes and is stored in ledger 918. An example set of transactions, i.e. entitlement events, is given below in Table 2.

TABLE 2

Blockchain Entitlement Transactions

| Type of transaction | Description of the transaction |
|---|---|
| Create—New Entitlement | Adds a block to the blockchain that specifies a newly created entitlement, including an associated smart contract, and returns a unique entitlement identified (EUID). |
| Create—Add-on Entitlement | Adds a block to the blockchain that specifies an add-on entitlement, including an associated smart contract, and a link to the associated entitlement, and returns a unique entitlement identified (EUID). |
| Create—Renewal Entitlement | Adds a block to the blockchain that specifies a renewal entitlement, including an associated smart contract, and a link to the associated entitlement, and returns a unique entitlement identified (EUID). |
| Revoke Entitlement | A logical "deletion" of an entitlement while retaining the audit trail via the transaction. Requires the EUID of the entitlement to be revoked |
| Report Usage | Report usage data about an entitlement. This results in a usage block being added to ledger 918. |
| Request Product Activation | Indicate that an end-user wants to start using an entitled product. |
| Associate Entitlement | Associates an entitlement with an "asset" (e.g. a computing device, or any other asset that might be entitled for use or another entitlement(s) resulting in a entitlement "Container Scope". |
| Reassign Entitlement | Allows an entitlement association to be reassigned within a container. |
| Create "Child" Entitlement | Allows an entitlement to be assigned, split or transferred to a different owner. The creation of a child entitlement using a blockchain transaction allows for retention of an audit trail over the life cycle of an entitlement an all associated entitlements. |
| Add smart contract | Adds a smart contract 916 into blockchain fabric 912. |
| Update a smart contract | Update a smart contract 916 with a newer version |

As used herein, an add-on entitlement modifies or extends the usage rights of an existing entitlement or of a group of in-force, i.e. currently applicable, entitlements. An add-on entitlement typically adds additional functions or capabilities to any currently in-force entitlements. A renewal entitlement simply extends the time period during which an entitlement is valid, i.e. extends the time period during which the entitled product can be used by the end-user. A renewal entitlement can be considered as a special case of an add-on entitlement.

Each time blockchain 912 receives a transaction request it executes a smart contract 916 that corresponds to the type of entitlement being processed. Create transactions, including create renewal and create add-on transactions, and report usage transactions result in new blocks being added to ledger 918. Also, in certain embodiments, a revoke transaction results in an add-on entitlement block being added to ledger 918 with a status of "Revoked".

Entitlements are added to ledger 918 via create entitlement transactions, which essentially add rights to use entitled product 950. Usage transactions result in blocks being added to ledger 918 that reduce or debit against those rights.

To understand the balance, i.e. remaining rights left, of an entitlement, ledger 918 is read, with respect to a specific EUID; and entitlement blocks that add rights are balanced against usage blocks that deduct rights. It may be appreciated that certain rights added by entitlement blocks may expire, for example if the rights are granted for a period of time. In addition, rights can be revoked. In certain embodiments, this process is executed by a smart contract every time an entitlement or usage transaction request is received by transaction service 914. The container mechanism, implemented by container service 922 provides a straightforward way to identify all blocks associated with a particular entitlement, thus streamlining this process. Further, the ability to associate a smart contract 916 with a container 924 provides way to enforce entitlement policies specific for different types of entitlements. An example of how the blockchain entitlement mechanism works is given below in Example 1.

Example 1

Software Usage Metered by Seats. In this example, an entitlement for the use of a software components is measure, or metered, based on the number of seats, i.e. the number of deployed uniquely identified instances of a software component. As a result of end-user 960 purchasing a number of seats from vendor 930, EMS 940 issues a create entitlement transaction to transaction service 914. The entitlement transaction message includes a "Meter Type" attribute that indicates that the meter is seats, and a "Meter Value" attribute that indicates the number of seats purchased, or entitled. In this example, 16 seats are entitled, thus the meter value is set to 16. A smart contract 916, receives and processes the incoming transaction request and adds a new, or base, create entitlement block, to ledger 918. The new entitlement block specifies that "Meter Type=Seat" and "Meter Value=16". Subsequently, each time smart contract 916 processes a transaction request associated with this base entitlement it checks to see how many of the 16 seats have been used. Thus, when smart contract 916 processes a report usage transaction that reports that a number of seats have been used, it adds a usage block to the ledger 918. If the number of seats used reaches 16 or greater, i.e. the entitlement limit, smart contract 916 executes an entitlement policy defined by vendor 930.

Blockchain Transaction Message Structure

Components of system 900 interact with blockchain 910 using request—response message pairs. In certain embodiments, each request response pair has a header form that includes a unique transaction (TRX) identifier. The TRX identifier, which is typically an alphanumeric value, is generated by the component that issues a TRX request message. This TRX identifier is carried end-to-end on request, and then returned end-to-end on. Table 3 below lists an example format for the fields in a TRX message:

TABLE 3

| Fields in a transaction (TRX) message | |
|---|---|
| TRX Identifier | Uniquely identifies a transaction |
| Version | Version number of message format being used for request and response messages. |

TABLE 3-continued

| Fields in a transaction (TRX) message | |
|---|---|
| TRX Identifier | Uniquely identifies a transaction |
| EUID | Entitlement unique identifier. A unique identifier for a new entitlement to be added to ledger 918. |
| Owner | The owner of the entitlement. |
| Timestamp | A timestamp that gives the date and time when a transaction request is made. |
| Link | An EUID of an entitlement to which this entitlement is linked, or associated. Typically, this is the base, or first, entitlement for a linked set of entitlements. |
| Noun | The type of transaction; for example, an entitlement transaction; or more generally, the object to be operated on by an associated smart contract. |
| Adjective | The type of noun; for example, if the noun is Entitlement then possible adjectives are renewal, or add-on |
| Verb | Action to be taken; for example, if Entitlement is the noun then Create and Revoke are verbs. |
| Adverb | Additional description of verb. Typically, this will be the name, or identifier, of a smart contract to execute. |
| Error | An error code may be returned in the event of a problem. |
| Data | Data is typically included in a message. For example, the data may include the agreed-to terms or values of an entitlement, such as al length of time. There may be a size limit on the amount of data that can be included. |
| Data Link | A link such as a filename or URL can be used to reference external data. |

This approach to modeling data objects is based on natural language. For example, in the case of a transaction for creating a renewal entitlement:

Noun=Entitlement

Adjective=Renewal

Verb=Create

Adverb=Name of a smart contract associated with the entitlement

Data=EUID of the entitlement being renewed, length of renewal period

Adverbs may be associated with "hard assets", i.e. real-world goods and services. For example, if an Entitlement is to be associated with an item of hardware with a specific identifier such as IP address or hardware serial number, this would be defined in the Create Entitlement command as an "Adverb" qualifier to the Verb Create in the header along with a unique identifier for the item of hardware in the data field.

Figure 10:
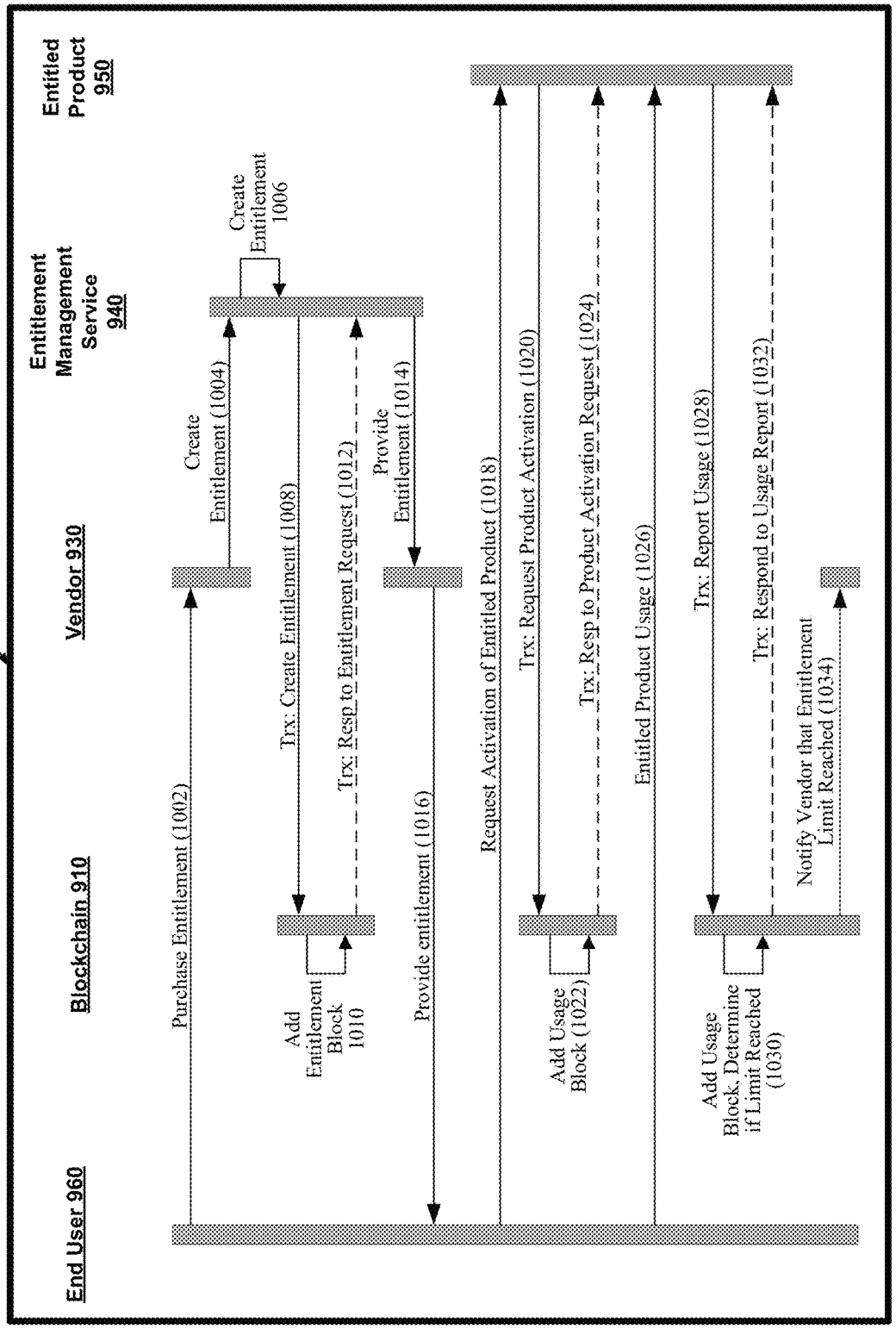
FIG. 10 illustrates an embodiment of a sequence of entitlement transactions performed by the various components of the system.

FIG. 10 illustrates an embodiment of a sequence of entitlement transactions 1000 performed by the various components of system 900.

At step 1002 end-user 960 purchases an entitlement to use entitled product 950 under a specified set of usage conditions. In turn, at step 1004, vendor 930 issues a request to create a new entitlement from EMS 940. Additional steps may be required to place an order; for example, end-user 960 may first request a quote for purchase of an entitlement to use entitled product 950 under a specified set of usage conditions. Vendor 930 may then provide a response to the request for quote. However, the specific steps entailed in making a purchase are outside the scope of the subject invention.

At step 1006 EMS 940 creates an entitlement which is implemented as a data structure that includes the terms and conditions, including usage conditions, of the order placed at step 1002. Typically, EMS 940 stores a set of entitlement prototypes. An entitlement prototype is an unpopulated data structure that serves as a template to create an instance of an entitlement data structure. To create an entitlement, EMS 940 selects an appropriate entitlement prototype and enters or populates the data structure elements with values that define the specific terms of the entitlement being purchased. For example, if the entitlement is an auto rental for a period of time, then an auto rental entitlement prototype is selected, and the duration of 7 days is added to specify the 7 day period. Additionally, at step 1006 EMS 940 generates a unique end-user identifier (EUID) which is a unique identifier that is subsequently used to refer to the entitlement.

At step 1008 EMS 940 initiates a transaction with blockchain 910 to create a new entitlement on the blockchain by sending a create entitlement request. At step 1010 blockchain 910 executes a smart contract that corresponds to the entitlement transaction which performs the processing at this step. The corresponding smart contract creates an entitlement block that includes the entitlement transaction data and adds the entitlement block to ledger 918. In certain cases, a new blockchain may be created at this point; for example, if a new end-user is requesting a new entitlement. Subsequent transactions concerning the entitlement add blocks to the blockchain. Blockchain 910 then completes the entitlement transaction processing by sending a response to the create entitlement request at step 1012 to EMS 940 indicating success or failure. In the event of failure, the response may include an error code.

At step 1014, EMS 940 provides the entitlement data, including the associated EUID, to vendor 930. At step 1016, vendor 930 provides the entitlement along with the EUID to end-user 960. The EUID henceforth is used to refer to the entitlement. At this point, end-user 960 has access to and can begin to use entitled product 950.

The actual method of fulfillment or provision of the product or service is outside the scope of this method. For example, if the end-user is licensing computer software then an electronic software delivery service such as ESD 128 makes the software available to end-user 960. If end-user 960 licenses a song then the song, in the form of a digital music file, would typically either start streaming to a music player operating in end-user 960 or be downloaded onto the end-user's mobile device or personal computer and added to their music library.

At step 1018, when end-user 960 attempts to use the entitled product it sends an activation request, which includes the EUID, to entitled product 950. At step 1020, entitled product 950 issues a request for product activation to blockchain 910, including the EUID in the request. At step 1020 entitled product 950 issues a transaction requesting activation to blockchain 910. At step 1022 blockchain 910 adds a usage block to ledger 918 that indicates product activation. Then blockchain 910 returns a response to the product activation request at step 1024.

The preceding four steps, 1018-1024 are performed in cases where the entitled product communicates directly with end-user 960 and blockchain 910. For example, a software program that is licensed and downloaded to end-user 960 may be capable of receiving an activation request from end-user 960. However, in other cases entitled product 950 may not be capable of performing these exchanges. For example, if the entitled product 950 is a gift card for 10 massages from a massage provider then the massage itself is obviously not capable of communicating over the Internet. In this case, other methods for communicating the product activation information may be provided. For example, end-user 960 or vendor 930 (i.e. the massage therapist or the company for which the massage therapist works) can provide the activation information to blockchain 910.

At step 1026 end-user 960 uses entitled product 950. At step 1028 entitled product 950 initiates a report usage transaction that reports usage by end-user 960 to blockchain 910.

At step 1030, blockchain 910 executes a smart contract that corresponds to the usage transaction to perform the transaction. The smart contract adds a usage block to ledger 918 that includes usage transaction data. Each usage transaction results in a usage block being added to ledger 918 and counts against a previously stored entitlement block that entitles usage of entitled product 950 by end-user 960. The previously stored entitlement may be an original entitlement, an add-on entitlement or a renewal entitlement. A report usage transaction may be initiated to report, for example, an instance of use of entitled product 950, a calendar period during which entitled product 950 was used, an elapsed period of time during which entitled product 950 was used, an amount of usage such as the number of megabytes downloaded, a number of installed seats of a software component, or another unit of usage.

As part of step 1030, the smart contract also analyzes the history of usage, as specified by the series of usage blocks that have been added to ledger 918, against the various entitlements associated with the base entitlement to determine if a usage limit has been reached.

At step 1032 blockchain 910 returns a response to the report usage transaction.

Steps 1026-1032 repeat an arbitrary number of times. With each usage event, blockchain 910 executes a smart contract associated with entitlement under which entitled product 950 is currently operating. The smart contract determines whether usage has reached or exceeded the entitlement limit. The entitlement limit is defined by the cumulative rights of those entitlements currently applicable, or in-force. The entitlement limit is reached when further usage of the entitled product would exceed the rights afforded by the currently in-force entitlements. If the entitlement limit is reached, then the associated smart contract may perform an action specified by an entitlement policy. In this example, the smart contract, executed within blockchain 910, sends a notification, at step 1034, to vendor 930 that the entitlement limit has been reached.

Generally, once a usage limit is reached, the smart contract corresponding to a usage transaction for an entitlement performs actions specified by the policy for the entitlement. Other components may also cooperate to enforce an entitlement policy. A partial list of actions that may be taken when a usage limit is reached is given below in Table 4. As listed in Table 4, two options that are typically made available are to end-user 960 are to purchase an add-on entitlement or to purchase a renewal entitlement that enables end-user 960 to continue using entitled product 950.

TABLE 4

Actions that may be Performed Upon Reaching Usage Limit

| Component performing action | Action Taken |
|---|---|
| Smart Contract | Notify end-user |
| Smart Contract | Notify vendor |
| Smart Contract | Notify EMS |

TABLE 4-continued

Actions that may be Performed Upon Reaching Usage Limit

| Component performing action | Action Taken |
| --- | --- |
| Smart Contract | Notify entitled product |
| Entitled product | Halt product function |
| Vendor | Notify end-user |
| Vendor | Enable end-user to purchase add-on entitlement |
| Vendor | Enable end-user to purchase renewal entitlement |

Use of Containers to Manage Associated Entitlements

An entitled product may be subject to multiple entitlements. Containers offer a mechanism to associate entitlements with one another. For example, if a mobile phone vendor sells an entitlement to an end-user to use a mobile phone for 3 years and the sale also includes a streaming movie service that enables the end-user to view movies on the mobile phone for 1 year then there are two entitlements, one for the mobile phone and the other for the streaming movie service. Each entitlement is given a distinct, unique, EUID. However, since the streaming movie service can only be used on the entitled mobile phone the two entitlements are associated. They can be managed within a single container that includes information about the link or association between the two entitlements. Thus, containers provide a way to model product configurations and solutions.

Containers can be used in a wide range of instances. For example, if an end-user rents a car and also rents a GPS device, then if the end-user finds that the GPS device is not helpful then he/she may want to return it before he/she returns the car. This case can be managed by including the two entitlements (car rental entitlement and GPS device entitlement) in a single container.

Whenever two or more entitlements are linked, or associated, a container is created. Also, whenever an add-on or renewal entitlement block or usage block is added to ledger 918 it is linked to the original entitlement that is being renewed. The first entitlement in the chain is referred to as a base entitlement. A container includes all linked entitlement and usage blocks.

In certain embodiments, a container is implemented as a linked list of transactions or blocks where blocks are linked to each other forwards and backwards as a list with a base entitlement block at the top. The base entitlement of a container typically corresponds to the base configuration element of a product or service. For example, using the example of an auto lease, the lease of an auto of a particular make/model and year with a certain set of features would constitute a base entitlement. Additional features, such as a GPS package or music service would be add-on entitlements that are linked to the base entitlement. In certain embodiments, the EUID of the base entitlement of a container is used as the unique identifier or EUID of the container itself. In other embodiments, each container may be accorded its own unique identifier.

It may be appreciated that other data structures than a linked list can be used to implement a container without departing from the scope and spirit of the subject invention. For example, a table or database may be used.

Container 924 can be regarded as a Business Data Object (BDO) that includes a set of linked entitlements. A smart contract can be configured to execute when a new entitlement or usage block is added to the container. Thus, a smart contract that executes as a result of a transaction pertaining to an entitlement within container 924 may be configured to take an action or make a policy indication that is at the container level, such as to enforce configuration or usage rules.

For example, referring to blockchain entitlement example 1 regarding the seats to meter usage of a software component, when a usage transaction is received a corresponding smart contract executes. The smart contract adds a usage block to ledger 918 and analyzes the container that includes the new usage block to determine if the number of seats in use reaches or exceeds the 16 seat limit. If so then smart contract performs a policy action, such as one of the actions listed in Table 4, hereinabove.

Thus, container service 922 implements a linking structure that associates a sequence of entitlements and usage reports and provides, via smart contracts, a set of business rules that enforce usage policies for the associated entitlements.

Figure 11A:
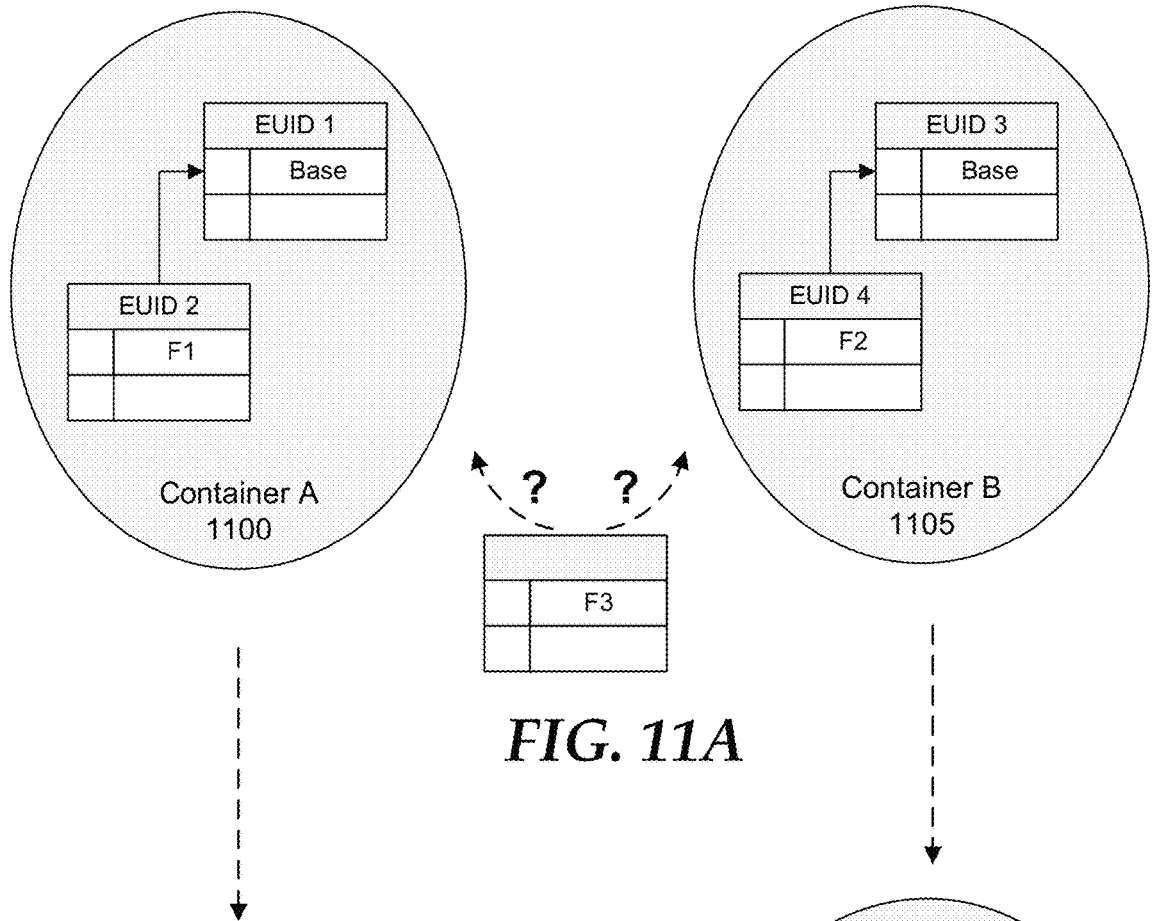
FIGS. 11A-B illustrate an example embodiment of the use of containers for representing the association of entitlements
Figure 11B:
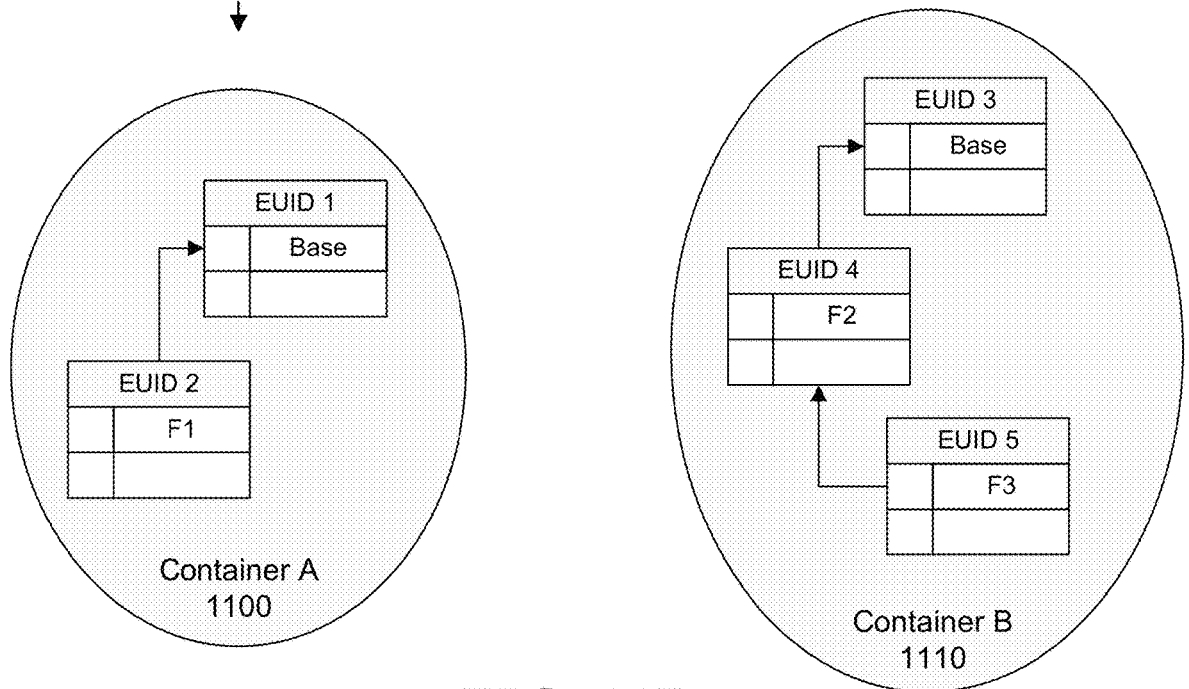

FIGS. 11A-B illustrate an example embodiment of the use of containers for representing the association of entitlements. In FIG. 11A, two containers, container A 1100 and container B 1105 are illustrated. In this example, an auto rental company has leased 2000 vehicles, from a leasing company, which they intend to rent to end-users. Of the 2000 vehicles, 1000 have a base configuration plus one feature package, referred to as F1, and 1000 vehicles have a base configuration plus a different feature package F2. Container A 1100 includes the initial two entitlements, EUID 1-2, for the base vehicle and feature F1. Container B 1105 includes the two entitlements, EUID 3-4, that cover the second group of 1000 vehicles.

Container A 1100 is established at the time that EUID 1 and EUID 2 were created, with EUID 2 linking to EUID 1. Similarly, Container B 1105 is established at the time that EUID 3 and EUID 4 are created with EUID 4 linking to EUID 3.

Sometime later, the owner of the two entitlements decides to purchase 1000 units of a third feature package F3. Thus, there is a question as to whether F3 should be added to the thousand units of Container A 1100 or the thousand units of Container B 1105, or possibly to a combination of vehicles covered by the two containers. However, in this example, configuration rules require that feature package F2 must be present before F3 can be added. Thus, F3 must be added, using an add-on transaction to the vehicles covered by the entitlements of Container B 1105.

A real-world example of this sequence of transactions can be taken from cable television. For example, the base entitlement might be access to the cable network with a base set top box; and F2 may be an enhanced set top box. F3 may be an enhanced set of channels that require the enhanced set top box of F2. For F3 to be entitled there may be a technical requirement that F2 is necessary or it make be a market-based decision.

FIG. 11B illustrates the entitlements and associations between the entitlements after an entitlement F3 has been added to Container B 1105. As illustrated, Container A 1100 doesn't change while an entitlement EUID 5 to feature set F3 has been added to Container B 1105 to produce a new configuration, namely Container B 1110.

It may be appreciated that while an entitlement may apply to a number of instances of a product, e.g. 1000 autos as in the example described above with reference to FIGS. 11A-B, that each individual auto, i.e. each instance, is tracked. For example, the entitlement transaction may include vehicle identification numbers (VINs) for each of the autos covered by each entitlement. Further, usage against an entitlement is tracked for each instance. This is important for a wide range of cases, for example, mobile phone entitlements often specify an upper limit on the amount of data the phone can use per month; or, as another example, an auto rental fee can be based on the number of miles driven.

The container mechanism is used to derive configuration data by traversing the associated entitlements and usage over time along a blockchain. At any moment, a container, which includes the data included in all transactions associated with a base entitlement provides configuration and status and can be considered as the "scope" of the Container. The current configuration may be considered as the entitlements within a container that are in-force, i.e. those that have not expired or been revoked. Since blockchain 910 immutably tracks all transactions configuration and status information can be determined for any particular instance. Currently there is no recognized mechanism for accomplishing this using blockchain technology.

Further, a container may be used to enforce a set of configuration rules, such as the rule from the previous example, described with reference to FIGS. 11A-B, that feature F3 can only be added if feature F1 is already present. These rules may be enforced in part by a vendor; they may also be implemented, or partly implemented, within a blockchain by a smart contract that has knowledge of a vendor's configuration rules.

Figure 12:
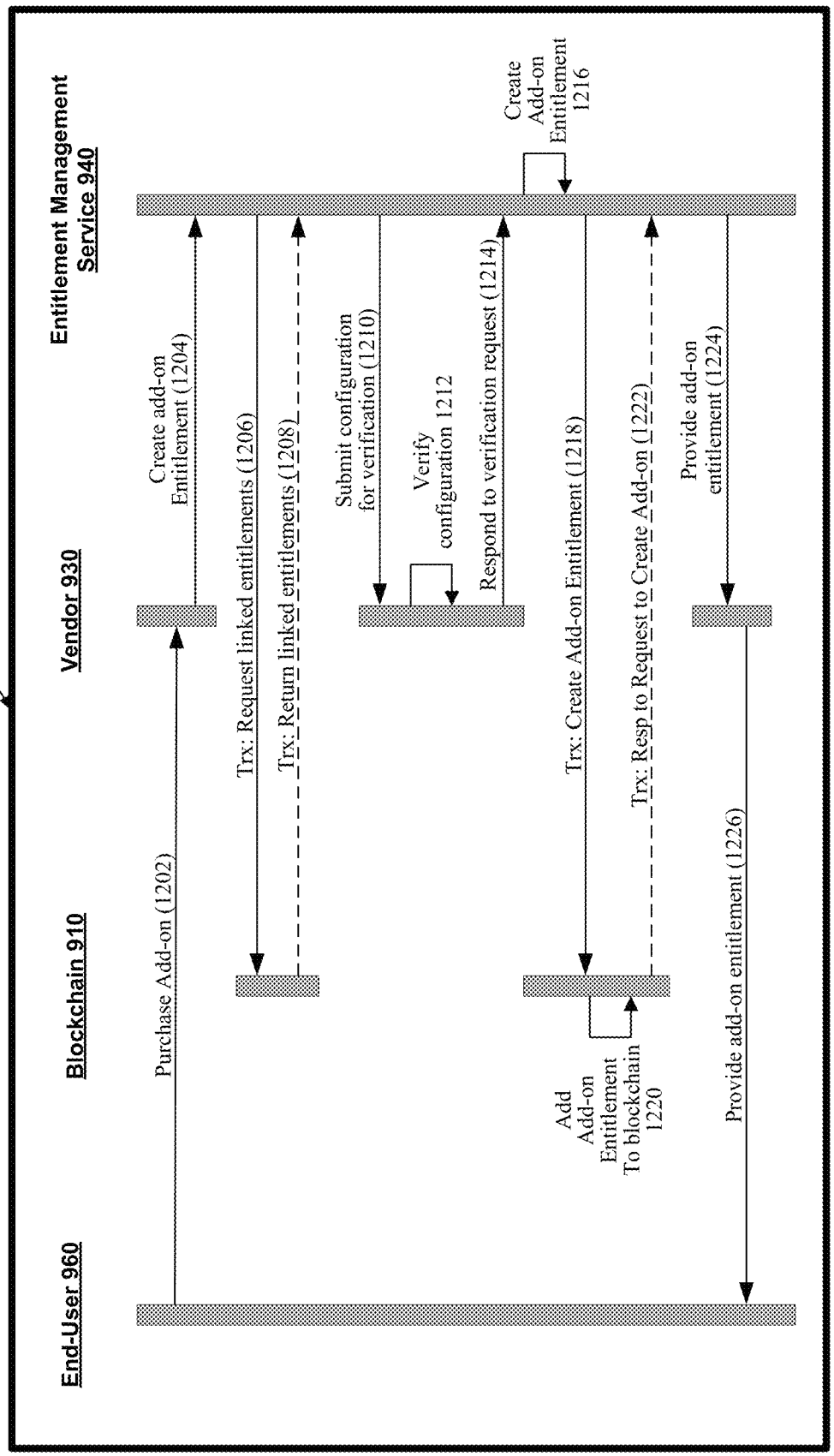
FIG. 12 illustrates an embodiment of a sequence of entitlement transactions that create an add-on transaction that enables an end-user to add usage rights to a previously purchased entitlement.

FIG. 12 illustrates an embodiment of a sequence of entitlement transactions 1200 that create an add-on transaction that enables an end-user to add usage rights to a previously purchased entitlement. In the discussion hereinbelow, an add-on entitlement is associated with a previously purchased and approved entitlement. The add-on entitlement adds usage rights in addition to any usage rights currently allowed by existing, in force, entitlements. A previously purchased entitlement to which an add-on entitlement is associated is referred to as an antecedent entitlement.

At step 1202 end-user 960 initiates the transaction sequence by purchasing an add-on to a previously purchased entitlement. This step may occur as a consequence of end-user 960 receiving a message that the entitlement limit of an antecedent entitlement has been or is about to be exceeded, as discussed with reference to FIG. 10. Or, end-user 960 may wish to purchase additional features or capabilities to add additional rights. For example, if a user purchases a mobile phone with a 3 GB data plan he/she may purchase an add-on entitlement to add 3 more GB of data to the plan before actually exceeding the initial allotment of 3 GB.

At step 1204 vendor 930 issues a request to EMS 940 to create the requested add-on entitlement, providing the EUID of the base entitlement or the EUID of an antecedent entitlement. In response, at step 1206 EMS 940 initiates a transaction with blockchain 910 to request information about the base entitlement and any linked add-on entitlements. At step 1208 blockchain 910 returns the requested entitlement information.

At step 1210 EMS 940 submits the configuration information to vendor 930 for verification. The configuration information includes information about the base entitlement and any add-on and renewal entitlements linked to the base entitlement as well as information about the add-on entitlement that end-user 960 has requested to purchase. The configuration information may be limited to in-force entitlements and to usage data against those in-force entitlements. The in-force entitlements are those entitlements whose terms currently apply to the use of entitled product 950 by end-user 960, i.e. those entitlements that have not lapsed, expired or been revoked.

At step 1212 vendor 930 verifies that the new configuration being requested is acceptable, i.e. vendor 930 determines that the configuration policy, or rules, allows end-user 960 to purchase the requested add-on entitlement given the entitlements currently in-force.

It may be appreciated that, in certain cases end-user 960 may wish to purchase an entitlement to use a new function or feature for which there is no particular policy. For example, if end-user 960 has purchased a car with a 5 year service plan that doesn't include tire service, he/she may be able to purchase additional tires for the car at any time and for any reason at the prevailing price from vendor 930.

At step 1214 vendor 930 responds to the verification request. Typically, the response is either that the proposed add-on purchase is acceptable or not. In certain embodiments, vendor 930 may propose a modified add-on entitlement that it deems to be acceptable.

The exact configuration policies that may be put in place by vendor 930 as well as the processing to verify whether a request is accepted or not is outside the scope of the subject invention. Thus steps 1210, 1212, 1214 may be performed in different ways by different implementations of the subject invention; in other cases, these steps may be omitted entirely.

At step 1216 EMS 940 creates an add-on entitlement. As part of this step, EMS 940 creates an appropriate message structure for the transaction, including data elements such as those specified in Table 3. At a minimum, EMS 940 creates a new EUID for the add-on entitlement, specifies the type of transaction being requested, and identifies the EUID of the base entitlement being extended.

At step 1218 EMS 940 initiates a transaction with blockchain 910 to request an add-on entitlement. At step 1220 blockchain 910 responds to the create add-on entitlement transaction request by executing a corresponding smart contract 916. Smart contract 916 adds the new, add-on, entitlement block to ledger 918 with an appropriate link to the most recently block in the container. If no container already exists, smart contract 916 creates a container. At step 1222 blockchain 910 returns a response to EMS 940 indicating success or failure of the transaction.

At step 1224 EMS 940 provides the add-on entitlement to vendor 930 along with an EUID that is used henceforth to reference the entitlement. Finally, at step 1226 vendor 930 provides the add-on entitlement information, including the EUID, to end-user 960. End-user 960 can now use entitled product 950 under the terms of the add-on entitlement. In certain embodiments, an activation step may additionally be required before end-user 960 can commence use.

It may be appreciated that because a renewal entitlement is a special case of an add-on entitlement that extends the length of time of an existing entitlement, sequence of transactions 1200 applies equally to the processing of renewal entitlements as to add-on entitlements.

The above specification, examples, and data provide a complete description of the manufacture and use of the composition of the invention. Since many embodiments of the invention can be made without departing from the spirit and scope of the invention, the invention resides in the claims hereinafter appended.

What is claimed is:

1. A computer-implemented method for managing entitlements, comprising:
   storing by a blockchain fabric (1) a ledger that comprises a sequence of blocks wherein each block stores data from a transaction request received from an entitlement management service; (2) at least one smart contract, wherein a smart contract processes a transaction on behalf of the blockchain fabric;
   creating, by the entitlement management service, a first entitlement, wherein an entitlement specifies usage rights for an entitled product;
   receiving by the blockchain fabric a create entitlement transaction request from the entitlement management service to add the first entitlement to the ledger, wherein the entitlement transaction request includes the specification of the usage rights;
   executing by the blockchain fabric a create entitlement smart contract;
   adding to the ledger, by the create entitlement smart contract, an entitlement block that includes the specification of the usage rights corresponding to the first entitlement;
   receiving by the blockchain fabric a create add-on entitlement transaction request from the entitlement management service to add a second, add-on, entitlement to the ledger, wherein the entitlement transaction request includes the specification of the add-on usage rights, wherein the add-on entitlement adds usage rights for the entitled product;
   executing by the blockchain fabric a create add-on entitlement smart contract;
   adding to the ledger, by the create add-on entitlement smart contract, an entitlement block that includes the specification of the add-on usage rights;
   issuing a usage transaction, by the entitled product, which reports usage data by the end-user to the blockchain fabric;
   upon receiving the usage transaction, executing a usage smart contract;
   adding to the ledger, by the usage smart contract, a usage block that includes the usage data;
   determining, by the usage smart contract, based on the cumulative usage rights as specified by the first and second entitlement blocks, and (ii) usage as specified by the usage blocks in the ledger, whether an entitlement limit has been reached; and
   sending a response to the entitled product, by the blockchain fabric, for the received usage transaction.

2. The method of claim 1 wherein creating an entitlement further comprises generating a unique identifier for the entitlement, and wherein the create transaction request, the create add-on entitlement transaction request, and the corresponding entitlement blocks each include the unique identifier.

3. The method of claim 2 further comprising:
   sending, by the end-user, an activation message to the entitled product, the activation request including the unique identifier;
   issuing, by the entitled product to the blockchain fabric, a product activation transaction request; request for product activation;
   upon receiving, by the blockchain fabric, the product activation transaction request, executing a product activation smart contract; and
   adding to the ledger, by the product activation smart contract, a usage block that includes the product activation transaction data.

4. The method of claim 1 wherein the usage rights of an entitlement are selected from the group consisting of a calendar period during which an entitled product may be used, a period of time during which an entitled product may be used, an amount that the entitled product may be used, and a maximum number of seats for which a software component may be installed.

5. The method of claim 1 wherein determining that the entitlement limit has been reached comprises determining, based on the usage blocks, entitlement blocks, and add-on entitlement blocks in the ledger, that further use of the entitled product by the end-user will exceed the cumulative rights granted by all entitlements currently in-force.

6. The method of claim 1 further comprising:
   upon determining that the entitlement limit has been reached, sending a notification to the entitled product that the entitlement limit has been reached.

7. The method of claim 1 further comprising:
   upon determining that the entitlement limit has been reached, sending a notification to the entitlement management service that the entitlement limit has been reached.

8. The method of claim 1 further comprising:
   upon determining that the entitlement limit has been reached, sending a notification to the vendor that the entitlement limit has been reached.

9. The method of claim 8 further comprising:
   upon receiving the notification indicating that the entitlement limit has been reached, enabling, by the vendor, the end-user to purchase an add-on entitlement.

10. The method of claim 8 further comprising:
    upon receiving the notification indicating that the entitlement limit has been reached, enabling by the vendor, the end-user to purchase a renewal entitlement that enables the end-user to use the entitled product for an additional period of time.

11. The method of claim 1 further comprising:
    upon receiving, by the entitlement management service, a response to the create entitlement transaction indicating that the entitlement has been successfully created, providing information about the entitlement to the vendor, wherein the information includes a unique identifier for the entitlement.

* * * * *